United States Patent
Takebe et al.

(10) Patent No.: US 8,224,090 B2
(45) Date of Patent: Jul. 17, 2012

(54) APPARATUS AND METHOD FOR ANALYZING AND DETERMINING CORRELATION OF INFORMATION IN A DOCUMENT

(75) Inventors: Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 925 days.

(21) Appl. No.: 12/005,527

(22) Filed: Dec. 27, 2007

(65) Prior Publication Data
US 2008/0187240 A1 Aug. 7, 2008

(30) Foreign Application Priority Data

Feb. 2, 2007 (JP) ................................. 2007-024125

(51) Int. Cl.
*G06K 9/34* (2006.01)
(52) U.S. Cl. .................... 382/173; 382/175; 382/229
(58) Field of Classification Search .......... 382/172–179, 382/209–217, 185, 181, 229–231; 715/221–226
See application file for complete search history.

(56) References Cited

U.S. PATENT DOCUMENTS

| | | | | |
|---|---|---|---|---|
| 5,787,414 | A * | 7/1998 | Miike et al. ............... | 715/243 |
| 5,953,724 | A * | 9/1999 | Lowry ..................... | 1/1 |
| 6,562,077 | B2 | 5/2003 | Bobrow et al. ........... | 715/204 |
| 7,468,801 | B2 * | 12/2008 | Wakeam et al. .......... | 358/1.14 |
| 7,522,176 | B2 * | 4/2009 | Tolle et al. ............... | 345/619 |
| 7,792,369 | B2 * | 9/2010 | Minagawa et al. ....... | 382/229 |
| 2002/0107885 | A1 * | 8/2002 | Brooks et al. ............ | 707/505 |
| 2003/0226117 | A1 * | 12/2003 | Wettstein ................. | 715/541 |
| 2004/0013302 | A1 * | 1/2004 | Ma et al. .................. | 382/209 |
| 2004/0078755 | A1 * | 4/2004 | Shinjo et al. ............. | 715/505 |
| 2005/0120296 | A1 * | 6/2005 | Zeuli ....................... | 715/507 |
| 2006/0136810 | A1 * | 6/2006 | Truong et al. ............ | 715/507 |
| 2006/0159345 | A1 * | 7/2006 | Clary et al. .............. | 382/186 |
| 2006/0239560 | A1 * | 10/2006 | Sternby ................... | 382/187 |

(Continued)

FOREIGN PATENT DOCUMENTS

JP          05-159101          6/1993
(Continued)

OTHER PUBLICATIONS

Japanese Office Action issued in Japanese App. No. 2007-024125, mailed Jun. 7, 2011.

(Continued)

*Primary Examiner* — Bhavesh Mehta
*Assistant Examiner* — Sean Motsinger
(74) *Attorney, Agent, or Firm* — Greer, Burns & Crain, Ltd.

(57) ABSTRACT

According to an aspect of an embodiment, an apparatus for analyzing and determining correlation of information contained in a given form containing blocks, at least one of the blocks containing data indicative of a header, the rest of the blocks containing data in association with header information, comprising: a memory for storing templates having nodes, character data associated with said nodes respectively, and relative position information between said nodes; and a processor for analyzing and determining correlation of the information according to a process comprising: obtaining data contained in said blocks in the given form, determining relative position of said blocks to produce relative position information, analyzing the data obtained from the blocks and the relative position information of the blocks in comparison with the character data and the relative position information of said nodes of said templates, and determining correlation of the data contained in said blocks.

2 Claims, 20 Drawing Sheets

U.S. PATENT DOCUMENTS

| | | | |
|---|---|---|---|
| 2006/0271847 A1* | 11/2006 | Meunier | 715/517 |
| 2006/0282758 A1* | 12/2006 | Simons et al. | 715/500 |
| 2008/0148147 A1* | 6/2008 | Poston et al. | 715/273 |
| 2008/0187240 A1* | 8/2008 | Takebe et al. | 382/278 |

FOREIGN PATENT DOCUMENTS

| | | |
|---|---|---|
| JP | A 5-159101 | 6/1993 |
| JP | 2005-044086 | 2/2005 |
| JP | 2005-173730 | 6/2005 |
| JP | A 2006-134106 | 5/2006 |
| JP | A 2006-209065 | 8/2006 |
| JP | A 2006-300325 | 11/2006 |
| JP | 2008-033830 | 2/2008 |

OTHER PUBLICATIONS

Akihiro Minagawa et al., "A Method of Logical Structure Analysis for Form Images with Various Layouts by Belief Propagation," IEICE PRMU Pattern Recognition • Media Understanding Dept. pp. 17-22, No. 301, vol. 106, Oct. 13, 2006.

* cited by examiner

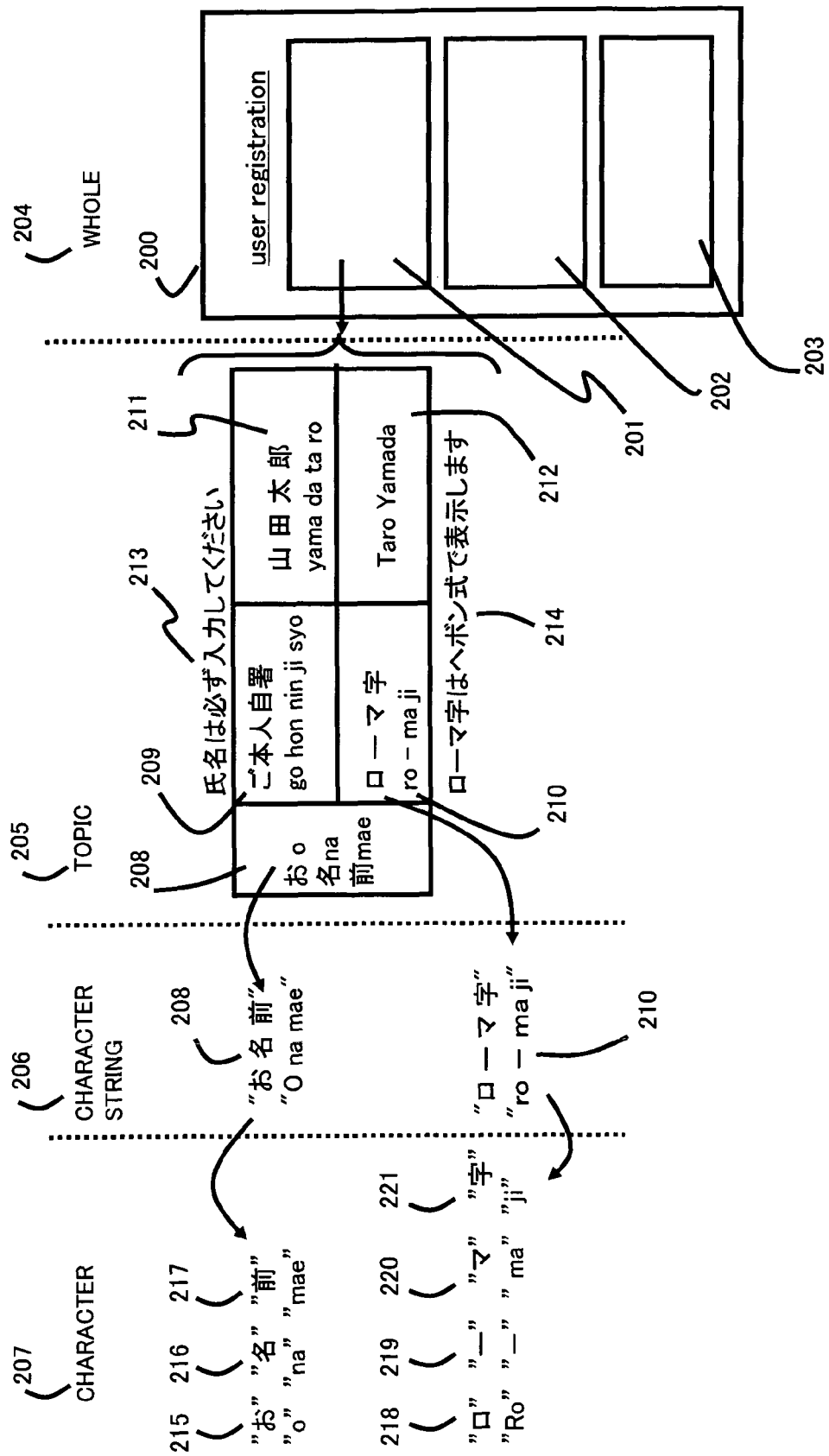

LOGICAL STRUCTURE TEMPLATE

TEMPLATE TABLE — Tet2

|  | NAME | SIGNATURE | ROMAN CHARACTERS | DATA #1 | DATA #2 |
|---|---|---|---|---|---|
| NAME |  | h | h | h | h |
| SIGNATURE |  |  | p | h | d |
| ROMAN CHARACTERS |  |  |  | d | h |
| DATA #1 |  |  |  |  | p |
| DATA #2 |  |  |  |  |  |

LOGICAL STRUCTURE TEMPLATE

APPARATUS AND METHOD FOR ANALYZING AND DETERMINING CORRELATION OF INFORMATION IN A DOCUMENT

TECHNICAL FIELD

The present invention relates to logical structure recognition programs, logical structure recognition methods, and logical structure recognition apparatuses.

Forms are often to be converted into electronic data. Thus, there is a demand for effective conversion of forms into electronic data. Effective conversion into electronic data can be achieved, for example, by automatically extracting a keyword and data from a form while recognizing the logical structure of a form image.

As examples of the related art, Japanese Unexamined Patent Application Publication Nos. 2006-300325, 2006-209065, 5-159101, and 2006-134106 are available.

SUMMARY

According to an aspect of an embodiment, an apparatus for analyzing and determining correlation of information contained in a given form which contains a plurality of blocks, at least one of the blocks containing data indicative of a header, the rest of the blocks containing data in association with header information, comprising: a memory for storing a plurality of templates having a plurality of nodes, character data associated with said nodes respectively, and relative position information between said nodes; and a processor for analyzing and determining correlation of the information according to a process comprising: obtaining data contained in said blocks in the given form, determining relative position of said blocks to produce relative position information, analyzing the data obtained from the blocks and the relative position information of the blocks in comparison with the character data and the relative position information of said nodes of said templates, and determining correlation of the data contained in said blocks.

BRIEF DESCRIPTION OF THE DRAWINGS

FIG. 4 is an illustration for explaining hierarchization;

DESCRIPTION OF THE PREFERRED EMBODIMENTS

Figure 1:
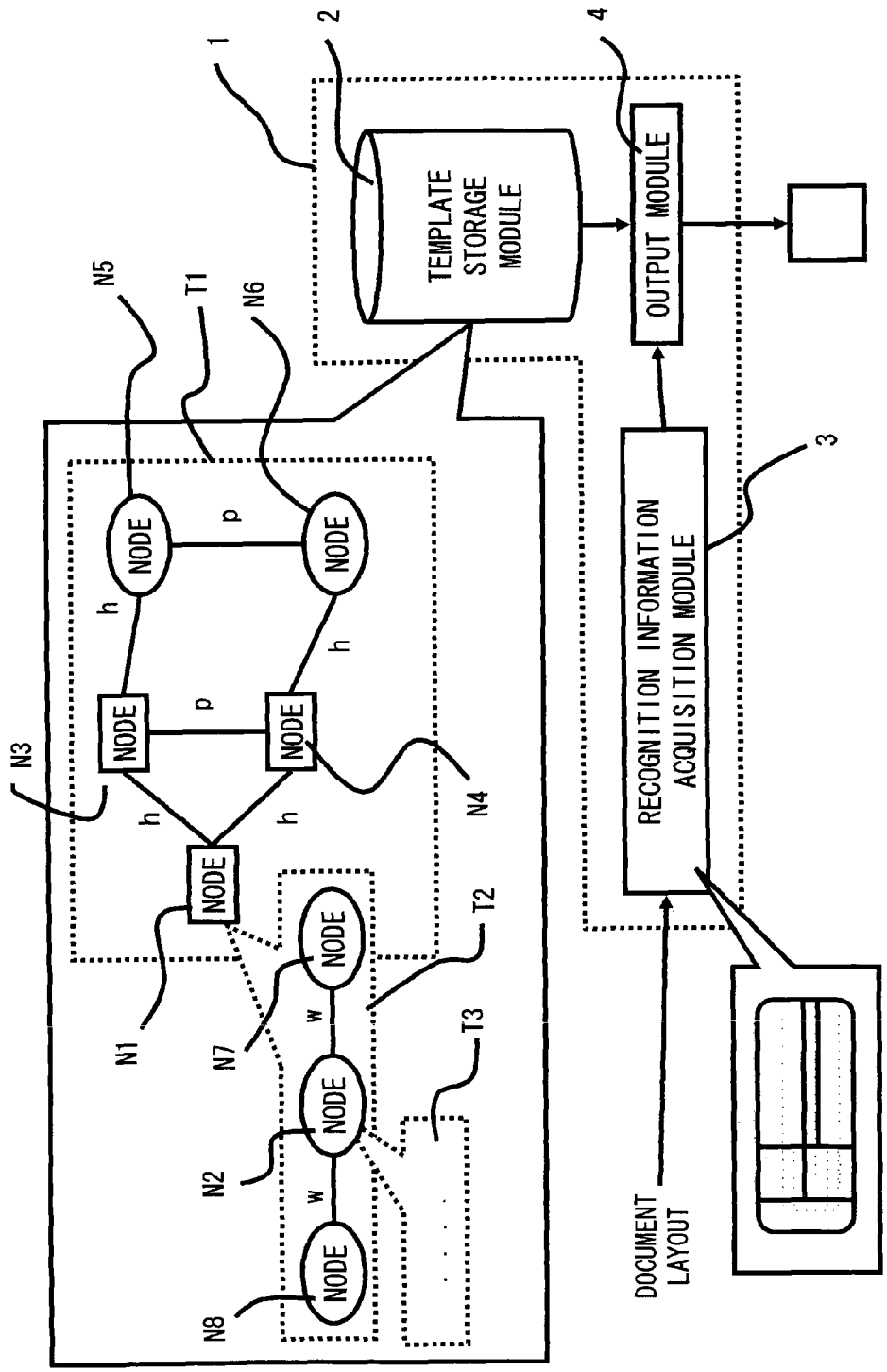
FIG. 1 shows an outline of the present invention.

Embodiments of the present invention will be described with reference to the drawings.

An outline of a technology before an embodiment of the present invention is applied thereto will be described. Automatically extracting a keyword and data from a form by recognizing the logical structure of a form image can be achieved, for example, by the processing described below. In first processing, a logical definition field representing the list of pairs of candidates for character strings of headers and regular expressions for data of the candidates for the character strings is prepared in advance. In second processing, character information obtained from a character recognition result of a form image is compared with the logical definition field. In third processing, a keyword is extracted.

There is another method for defining a header and data in accordance with a probability propagation method using the relationship between the hierarchy of a logical structure and the proximity in terms of layout. With this method, even the logical structure of a form having tables with a deep hierarchical structure can be recognized.

In addition, there are some methods for recognizing the logical structure of a general document. In one such method, regions having attributes, such as character blocks, character rows, graphics, and the like, obtained by document image dividing means are matched up with graph structure models in which document elements are represented by nodes and positional relationships are represented by links. In this method, it is determined which structure model matches the structure of a document image of interest. In this method, a label relating to the logical structure is provided to each of the regions.

Another method is available in which a recognition result is compared with a concept dictionary and schema information, it is determined whether the recognition result is an item or data, and association between an item and data is performed.

However, the above-mentioned methods have the problems described below. For example, hierarchical headers of forms cannot be supported. In addition, only a case where the relationship between a header and data is simple is supported. Furthermore, a header and data which are obviously unmatched may be incorrectly associated with each other. In addition, it is difficult to set a parameter. Moreover, some matching algorithms are depth-first search algorithms. In such an algorithm, correspondences of nodes in graph structures representing models are sequentially assumed in accordance with links. Thus, regarding targets of matching, there is a condition that the correspondence between layout elements and structure models must be surjective from layout elements onto structure models. In such matching, it is difficult to use documents having various layouts, and the matching is greatly affected by a layout before recognition of the logical structure and an error in character recognition. In addition, when the relationship between an item and data is complicated as in a table structure having a hierarchical structure, it is unclear how the correspondence between an item and data can be recognized.

Embodiments of the present invention solve the above-described problems. An embodiment of the present invention provides a logical structure recognition program, a logical structure recognition method, and a logical structure recognition apparatus that are capable of highly accurately recognizing a logical structure of a document having a complicated layout. In addition, an embodiment of the present invention provides a logical structure recognition program, a logical structure recognition method, and a logical structure recognition apparatus that are capable of highly accurately recognizing the logical structures of documents having various layouts without the necessity of preparing complicated models. In addition, an embodiment of the present invention provides a logical structure recognition program, a logical structure recognition method, and a logical structure recognition apparatus that are capable of recognizing the logical structure of a document without being affected by an error in layout recognition or character recognition.

An outline of an embodiment of the present invention will now be described.

In this embodiment, the layout of a document has a hierarchical structure consisting of the following hierarchical levels: "whole", "topic", "word", and "character". A plurality of qualitative layout structures are registered as logical structure templates for each hierarchical level of the document layout. The entire logical structure of a received form document can be recognized by searching for points that satisfy the layout structures and by achieving matching with obtained search results.

A logical structure template has a graph structure including nodes representing layout elements and relationships between the nodes. As the relationship between the nodes, a hierarchical relationship, an equivalent relationship, and the like are defined. Thus, various arrangements of layout elements can be expressed. For each hierarchical level, all the positional relationships actually used are registered as templates. In addition, a node is identified with a logical structure template at an immediately lower hierarchical level.

FIG. 1 schematically shows an embodiment of the present invention. A logical structure recognition program is capable of outputting templates that well match various document layout inputs and logical structure recognition results relating to document layout, which are matching results. A computer 1 that performs the logical structure recognition program has the functions described below. The logical structure recognition program causes the computer 1 to function as template storage module 2, recognition information acquisition module 3, and output module 4.

The template storage module 2 stores a plurality of templates each including a plurality of nodes. In each of the plurality of templates, the positional relationships between the plurality of nodes are defined, and each of the plurality of nodes includes a header or data. Each of the nodes of the template forms a lower-level template. In the lower-level template, the positional relationships between nodes forming the lower-level template are defined. A plurality of templates each including at least one node are stored in the template storage module 2. A node includes a header or data.

A template T1 shown in FIG. 1 includes three nodes (N1, N3, and N4) each including a header (for example, "onamae (name)", "juusyo (address)", or the like) and two nodes (N5 and N6) each including data. A template defines the positional relationship between nodes. Each of the nodes forms a template (lower-level template). A lower-level template defines the positional relationship between nodes forming the lower-level template.

A node N1 of the template T1 shown in FIG. 1 forms a template T2 including three nodes N2, N7, and N8. The node N2 of the template T2 forms a template T3. The area of a component unit of a node forming a template decreases as the hierarchical level becomes lower. The component units are, for example, "whole", "topic", "character string", and "character" in that order from a higher level to a lower level. "Topic" is a collection of character strings. The character strings forming a topic are semantically coherent. An administrator repeatedly generates such templates until a node indicating a character is formed. Each of the generated templates is stored in the template storage module 2.

The recognition information acquisition module 3 recognizes the layout structure of an externally received document layout. The recognition information acquisition module 3 obtains the layout structure of the document layout and character information.

The output module 4 detects a template corresponding to a received document layout. The output module 4 determines whether each of character strings included in the character information obtained by the recognition information acquisition module 3 corresponds to a character string for each node included in a template (template of interest). Then, the output module 4 recursively verifies the matching of the template formed by nodes determined to correspond to a character string and performs determination as to the correspondence of the template. The output module 4 performs such determination for each of the templates stored in the template storage module 2, and detects a template that matches the character information as the entire template of interest. The output module 4 also determines whether the positional relationship between nodes forming the detected template satisfies the acquired layout structure. Then, the output module 4 outputs, as a template for the received document layout, a template that satisfies the positional relationship.

With the above-described logical structure recognition program, the layout structure of a document layout and character information can be acquired. According to the logical structure recognition program, matching of a template can be recursively verified by determining the correspondence between lower-level nodes. Thus, the logical structure of a document having a complicated layout can be recognized highly accurately. In addition, by additionally registering a template, outside information can be easily acquired. Thus, there is no need to perform parameter tuning for various document layout inputs, such as an estimate sheet, a statement of delivery, and the like, and highly accurate recognition of a logical structure can be achieved using a common method.

Figure 2:
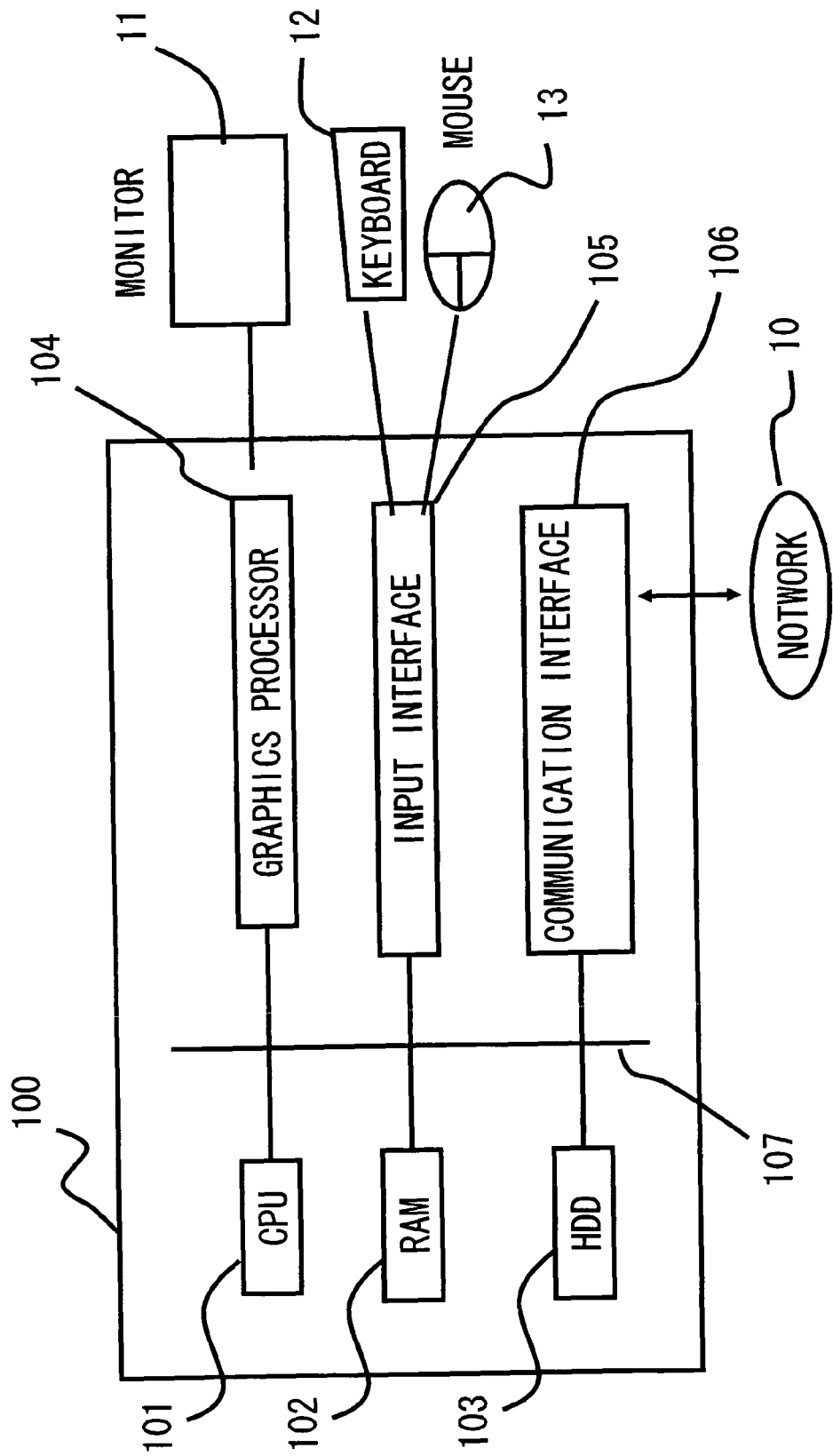
FIG. 2 shows an example of the hardware structure of a logical structure recognition apparatus.

An embodiment of the present invention will now be described. FIG. 2 shows an example of the hardware configuration of a logical structure recognition apparatus.

A logical structure recognition apparatus 100 outputs a template that well matches a received document layout. The logical structure recognition apparatus 100 detects a template that well matches the received document layout by performing logical structure recognition processing for applying each of a plurality of logical structure templates prepared in advance to the received document layout. The entire logical structure recognition apparatus 100 is controlled by a central processing unit (CPU) 101. A random-access memory (RAM) 102, a hard disk drive (HDD) 103, a graphics processor 104, an input interface 105, and a communication interface 106 are connected to the CPU 101 via a bus 107.

At least part of an operating system (OS) and an application program to be executed by the CPU 101 is temporally stored in the RAM 102. In addition, various data necessary for processing to be performed by the CPU 101 is stored in the RAM 102. An OS and an application program are stored in the HDD 103. A program file is stored in the HDD 103.

A monitor 11 is connected to the graphics processor 104. The graphics processor 104 causes an image to be displayed on the screen of the monitor 11 in accordance with an instruction from the CPU 101.

A keyboard 12 and a mouse 13 are connected to an input interface 105. The input interface 105 transmits to the CPU 101 via the bus 107 a signal transmitted from the keyboard 12 or the mouse 13.

The communication interface 106 is connected to a network 10. The communication interface 106 transmits and receives data to and from another computer via the network 10.

With the above-described hardware configuration, processing functions of this embodiment can be achieved. The logical structure recognition apparatus 100 having the above-described hardware configuration has functions described below so as to perform logical structure recognition processing.

Figure 3:
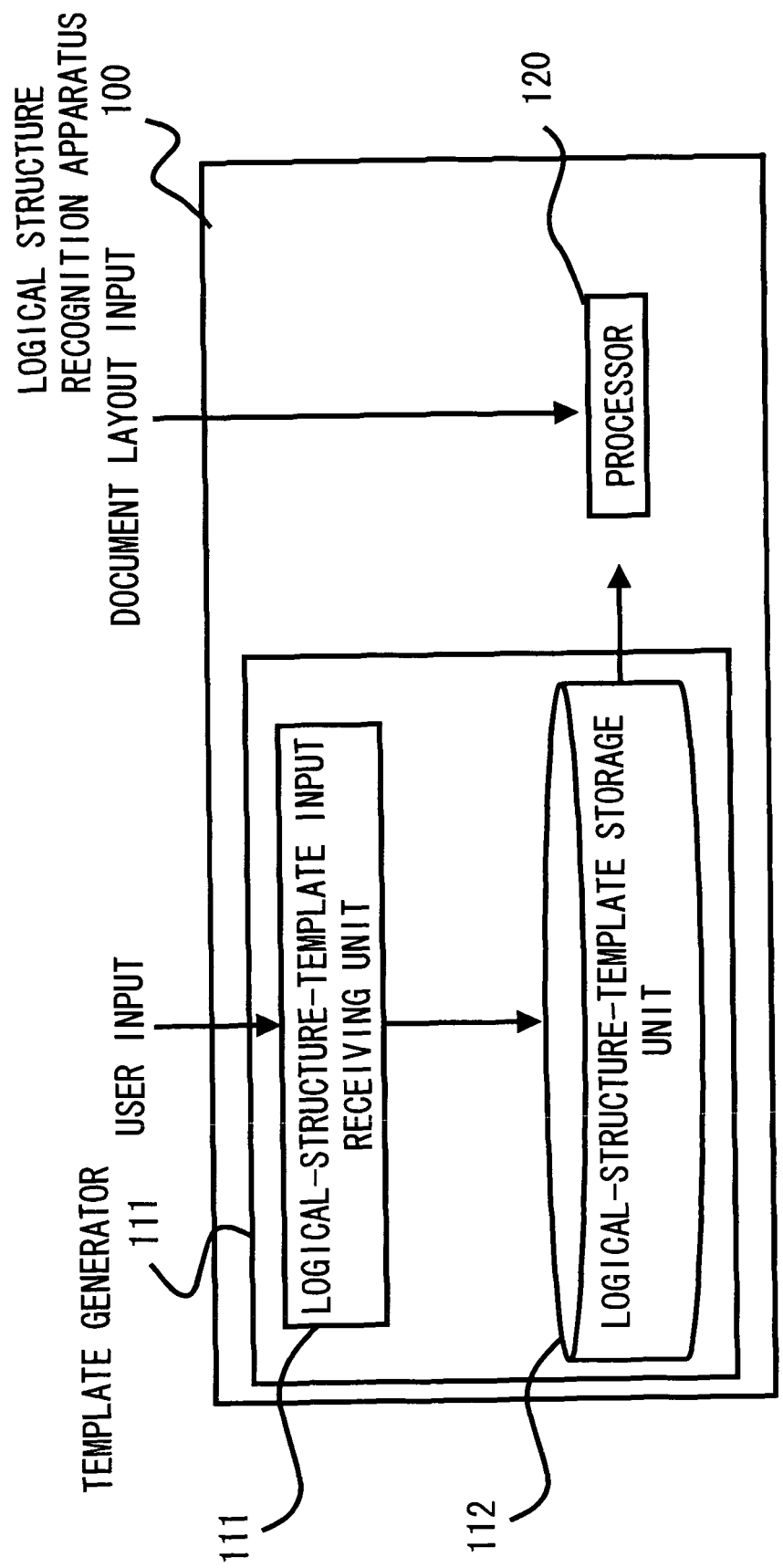
FIG. 3 is a block diagram showing functions of the logical structure recognition apparatus.

FIG. 3 is a block diagram showing functions of the logical structure recognition apparatus 100.

The logical structure recognition apparatus 100 includes a template generator 110 and a processor 120.

In accordance with a user input, the template generator 110 generates a logical structure template to be used by the processor 120 for performing logical structure recognition processing. The template generator 110 includes a logical-structure-template input receiving unit 111 and a logical-structure-template storage unit 112.

The logical-structure-template input receiving unit 111 displays on the monitor 11 an input receiving screen to be used for generating a logical structure template. The logical-structure-template input receiving unit 111 has a graphical user interface (GUI) function. A user generates a logical structure template using the keyboard 12 and the mouse 13 while viewing the input receiving screen. The generated logical structure template is a template in which the layout of a document has a hierarchical structure consisting of the following hierarchical levels: "whole", "topic", "character string", and "character". The logical structure template is generated such that the template has a layout common to a layout structure obtained by automatic layout recognition, automatic character recognition, and the like, which will be described later. Forms of the same type have common points, such as information items and the like, even when different layouts are used. For example, an estimate sheet includes "date information", "request number", and the like. Common items are integrated into a logical structure template. A logical structure template for a form includes, for example, a pair of a character string and data and the relationship between the character string and the data. A character string is, for example, "onamae (name)", "gohonnin jisyo (signature)", or the like, which is information forming a template. Data is, for example, information that is entered so as to correspond to a character string. Character strings are fixed, whereas data cannot be defined. However, the format in which data is expressed and the type of character of the data can be defined. For example, data of a date can be expressed, for example, as "**yearmonth**day" ("*" is a desired number).

The hierarchy will be described next.

FIG. 4 is an illustration for explaining hierarchization.

An application form 200 has a title such as "user registration". The application form 200 includes a name entry field 201 in which a name is entered, an address entry field 202 in which an address is entered, and a questionnaire entry field 203 in which answers to a questionnaire are entered. A hierarchical structure consists of the following hierarchical levels: "whole" 204, "topic" 205, "character string" 206, and "character" 207.

The hierarchical level "whole" 204 corresponds to the application form 200.

A topic is a collection of character strings that are semantically connected to each other. The hierarchical level "topic" 205 corresponds to the name entry field 201, the address entry field 202, or the questionnaire entry field 203. The name entry field 201 at the hierarchical level "topic" 205 is a collection of a plurality of character strings. The name entry field 201 includes a plurality of character strings, such as "o na mae" 208, "go hon nin ji syo" 209, "ro-ma ji" 210, "yama da ta ro" 211, "Taro Yamada" 212, "Please make sure to write name and address." 213, and "Roman characters are displayed using the Hepburn system." 214.

The character string "o na mae" 208 means name. The character string "o na mae" 208 indicates the category of the name entry field 201.

The character string "go hon nin ji syo" 209 indicates that a user should sign his/her name in the column for the character string 211. The character string "go hon nin ji syo" 209 means that the user should write his/her name by himself/herself for user registration in the column for the character string 211.

The character string "ro-ma ji" 210 indicates that the user's name is displayed in Roman characters. The character string "ro-ma ji" 210 means that the user's name should be displayed in Roman characters in the column for the character string 212.

The character string 211 "yama da ta ro" is the user's name written by the user in kanji characters (Japanese ideographic characters). The character string 212 "Taro Yamada" is the user's name displayed in Roman characters.

The character string "Please make sure to write name and address." 213 is a comment to be noted by the user when writing the character string 211 "yama da ta ro" for the character string "go hon nin ji syo" 209. The character string "Roman characters are displayed using the Hepburn system." 214 is a comment to be noted by the user when writing the character string 212 "Taro Yamada" for the character string "ro-ma ji" 210.

The character strings "o na mae" 208, "go hon nin ji syo" 209, "ro-ma ji" 210, and "yama da ta ro" 211 are written in English next to character strings written in kanji characters having corresponding meanings.

Each of the character strings "o na mae" 208 and "ro-ma ji" 210 is a collection of a plurality of characters. The character string "o na mae" 208 is a collection of characters "o" 215, "na" 216, and "mae" 217. The character string "ro-ma ji" 210 is a collection of characters "ro" 218, "-" 219, "ma" 220, and "ji" 221. A logical structure template will be described next.

A logical structure template represents the relationship between nodes (vertices).

Figure 5A:
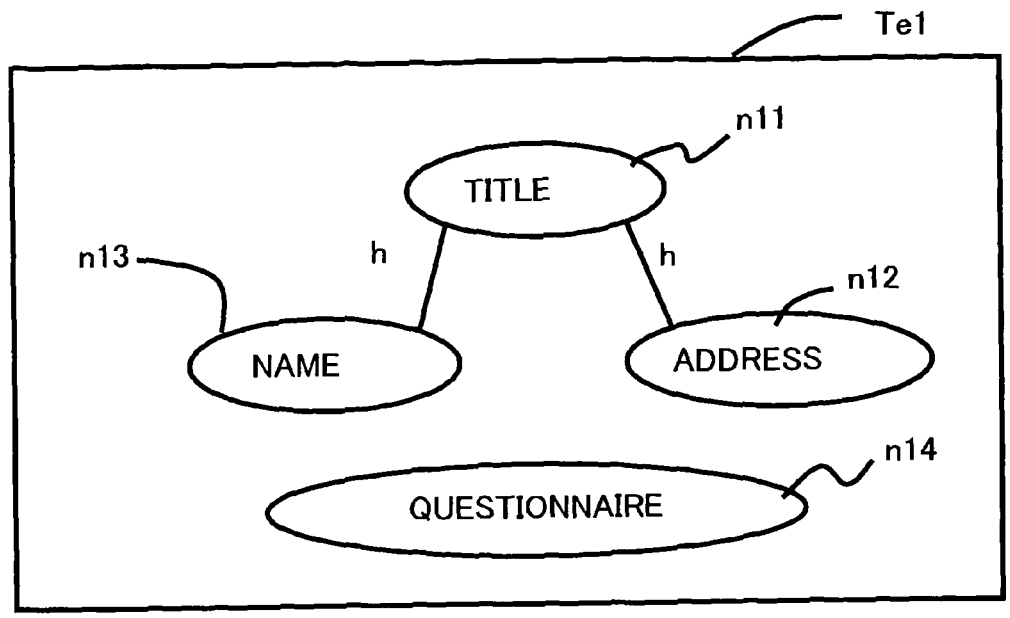
FIGS. 5A, 5B, and 5C show examples of logical structure templates.
Figure 5B:
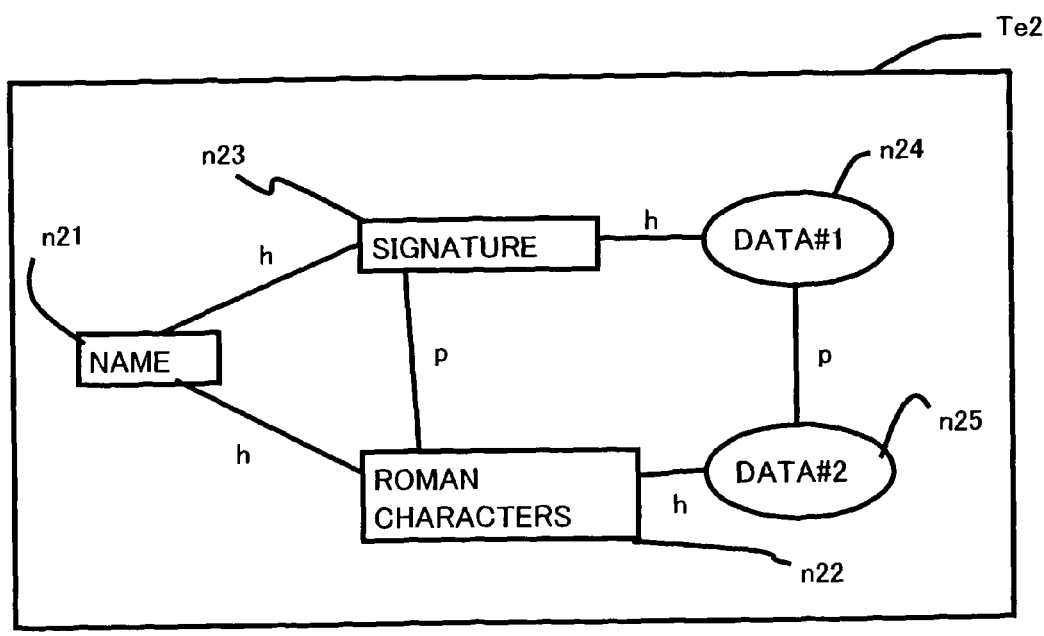
Figure 5C:
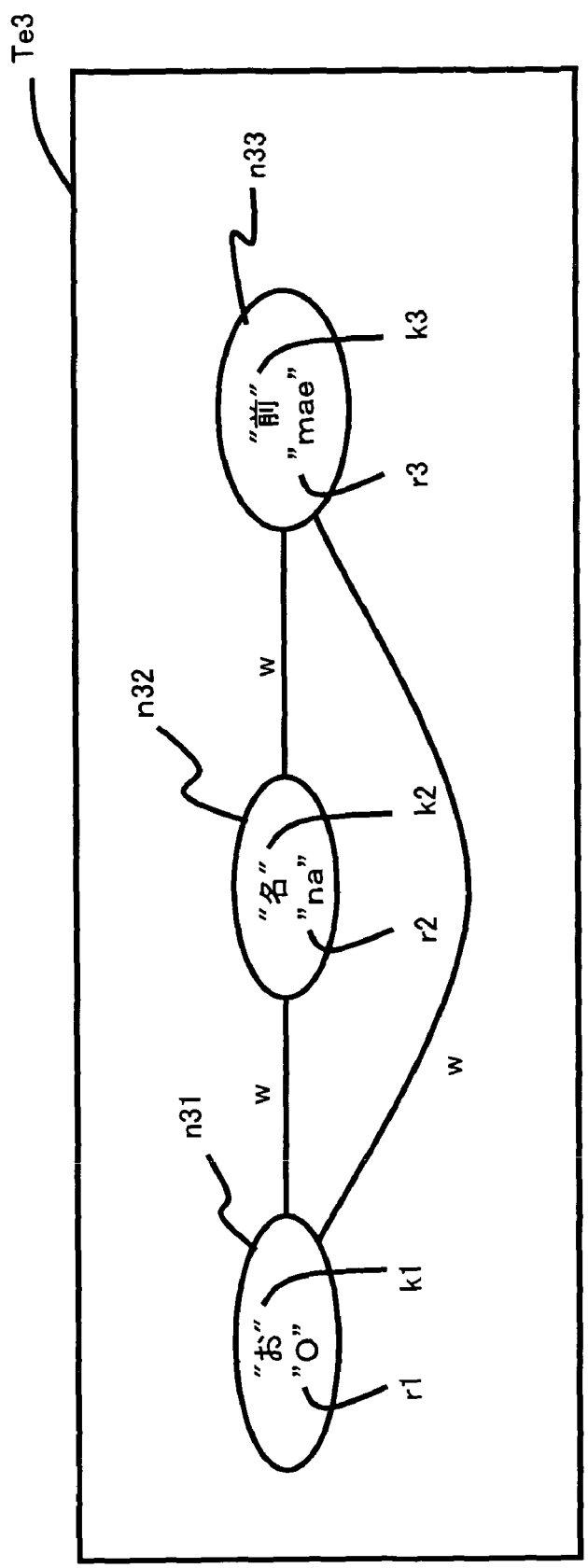

FIGS. 5A, 5B, and 5C show examples of logical structure templates. In each of FIGS. 5A, 5B, and 5C, for easier understanding, a logical structure template is illustrated such that the logical structure template is compared with a document layout hierarchy.

A logical structure template includes a set of nodes and a set of paths (branches or edges) connecting the nodes. The logical structure template represents information on "points and lines connecting the points" that is abstracted while attention is drawn to the "connection relationship" between the nodes.

Reference mark "Te1" in FIG. 5A denotes a logical structure template of "whole". Reference mark "Te2" in FIG. 5B denotes a logical structure template of "topic". Reference mark "Te3" in FIG. 5C denotes a logical structure template of "character string".

For example, the user generates the logical structure template Te1 shown in FIG. 5A.

The logical structure template Te1 shown in FIG. 5A includes nodes n11, n12, n13, and n14. The node n11 indicates "title". The node n12 indicates "address". The node n13 indicates "name". The node n14 indicates questionnaire.

The user generates the logical structure template Te2 for the node n13 of the logical structure template Te1. The user also generates logical structure templates for the "address" node n12 and the "questionnaire" node n14.

The logical structure template Te2 shown in FIG. 5B includes nodes n21, n22, n23, n24, and n25. The node n21 indicates "name". The node n22 indicates "Roman characters". The node n23 indicates "signature". The node n24 indicates "data". The node n25 indicates "data". The user generates the logical structure template Te3 for the "name" node n21 of the logical structure template Te2.

The logical structure template Te3 shown in FIG. 5C includes nodes n31, n32, and n33. Each of reference marks k1, k2, and k3 denotes a kanji or kana character. The combination of kanji or kana characters k1, k2, and k3 means "onamae (name)". A Roman character corresponding to the kanji or kana character k1 is "O" r1. A Roman character group corresponding to the kanji or kana character k2 is "na" r2. A Roman character group corresponding to the kanji or kana character k3 is "mae" r3. The node n31 indicates a character "o". The node n32 indicates a character group "na". The node n33 indicates a character group "mae".

When generating a logical structure template, the user designates nodes to be associated with each other. The user connects the nodes to be associated with each other through a path. The user adds an appended character indicating the relationship between the nodes.

Accordingly, a node is identified with one of logical structure templates at the hierarchical level immediately below the hierarchical level at which a logical structure template of the node is located. Thus, a node at any hierarchical level can be expressed as a collection of characters serving as nodes at the lowest hierarchical level. In addition, the user stores in each of nodes of character strings logical structure templates, which are the same or similar, that may be identified with each other as a list. This list is defined as a "possible template list".

Figure 6:
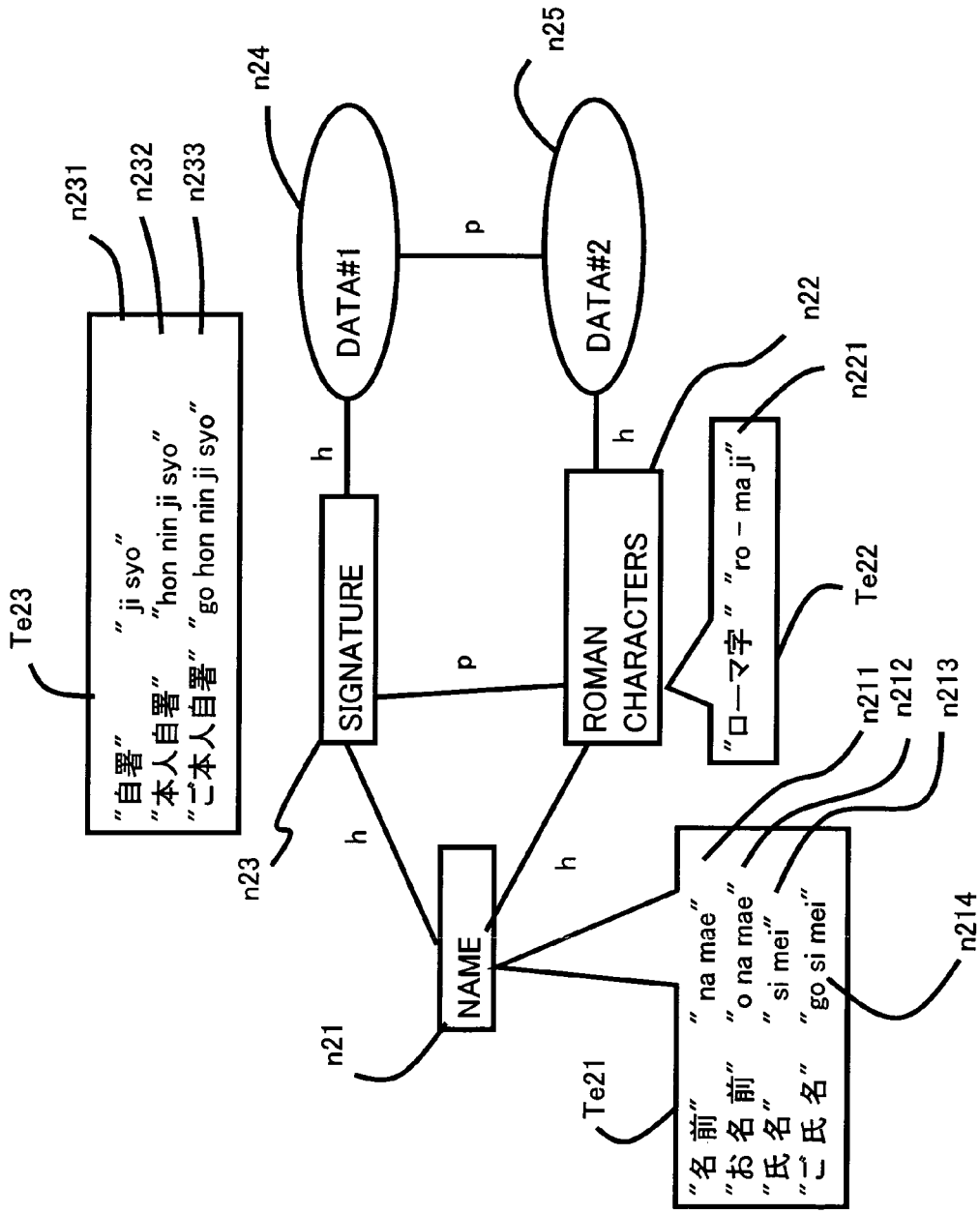
FIG. 6 shows possible template lists.

FIG. 6 shows possible template lists.

The template Te2 shown in FIG. 6 is a logical structure template of "topic". The logical structure template Te2 includes the "name" node n21, the "Roman character" node n22, the "signature" node n23, the "data#1" node n24, and the "data#2" node n25.

The "name" node n21 is associated with a possible template list Te21. The possible template list Te21 includes a "name 'na mae'" node n211, a "name 'o na mae'" node n212, a "name 'si mei'" node n213, and a "name 'go si mei'" node n214.

All the "name 'na mae'" node n211, the "name 'o na mae'" node n212, the "name 'si mei'" node n213, and the "name 'go si mei'" node n214 relate to name. Thus, when detecting "name" in a received form, the logical structure recognition apparatus 100 searches for the possible template list Te21 relating to "name".

The "Roman character" node n22 is associated with a possible template list Te22. The possible template list Te22 includes a "Roman character 'ro-ma ji'" node n221.

The "signature" node n23 is associated with a possible template list Te23. The possible template list Te23 includes a "signature 'ji syo'" node n231, a "signature 'hon nin ji syo'" node n232, and a "signature 'go hon nin ji syo'" node n233.

The logical-structure-template input receiving unit 111 stores a logical structure template of "whole", a logical structure template of "topic", and a logical structure template of "character string" in the logical-structure-template storage unit 112.

Figure 7:
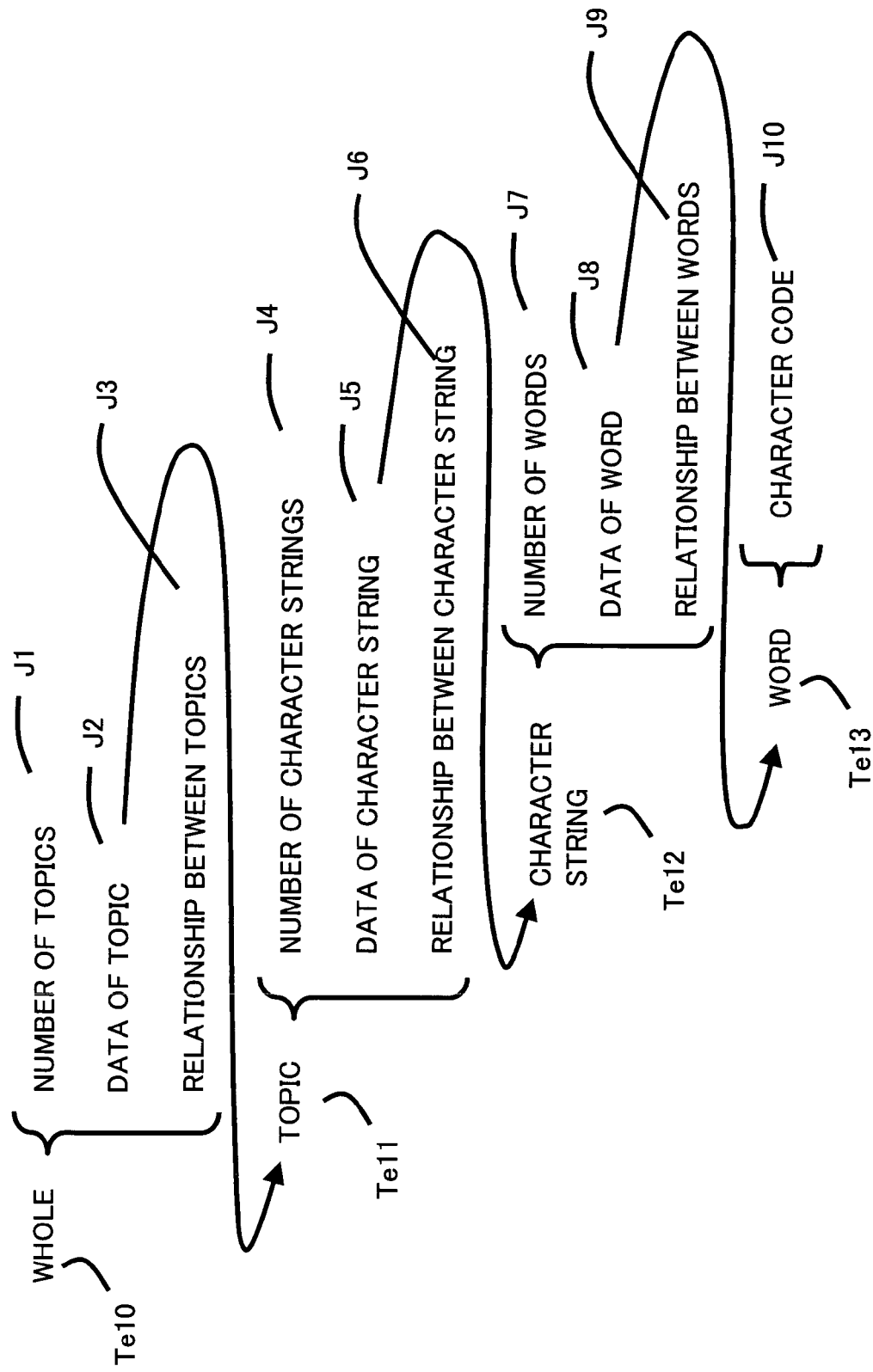
FIG. 7 shows the data structure of a stored logical structure template.

FIG. 7 shows data structures of stored logical structure templates.

As shown in FIG. 7, a logical structure template Te10 of "whole" includes "number of topics" information J1, "data of topic" information J2, and "relationship between topics" information J3.

A logical structure template Te11 of "topic" includes "number of character strings" information J4, "data of character string" information J5, and "relationship between character strings" information J6.

A logical structure template Te12 of "character string" includes "number of words" information J7, "data of word" information J8, and "relationship between words" information J9.

A logical structure template Te13 of "word" includes code (character code) information J10.

Relationships between nodes will be described.

Definition will be provided. A "real domain" indicates a region in which a logical structure template or a node is implemented in an actual layout. The relationship between nodes indicates the relationship between the nodes in real domains.

In a case where the entire collection of characters forming a node belongs to a cell and the cell consists only of the entire collection of characters forming the node, a real rectangular domain for the node is the region of the cell. A cell is each frame of a template. In the other cases, a real rectangular domain for a node is a circumscribed rectangle of a collection of characters forming the node.

Regarding a real rectangular domain for a node, the relationship between nodes can be expressed as a "hierarchical relationship (h)", a "parallel relationship (p)", a "word relationship (w)", and an "independent relationship (d)".

<Hierarchical Relationship (h)>

Figure 8:
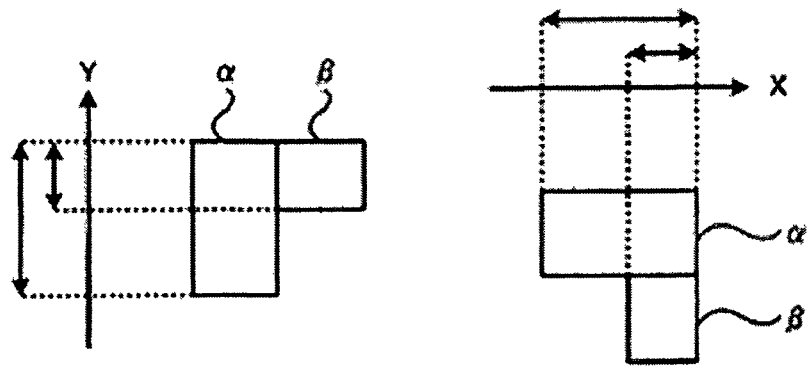
FIG. 8 shows a hierarchical relationship.

FIG. 8 shows a hierarchical relationship. In FIG. 8, "above" represents an upward direction in the figure, "below" represents a downward direction in the figure, "left" represents a leftward direction in the figure, "right" represents a rightward direction in the figure, a "Y direction" represents a vertical direction in the figure, and an "X direction" represents a horizontal direction in the figure (the same applies to FIGS. 9 and 10). In any of the cases described below, a hierarchical relationship (h) is satisfied between nodes a and b. The node a is a real rectangular domain α. The node b is a real rectangular domain β. In a first case, both the real rectangular domains α and β are cell domains, the real rectangular domain α is disposed to the left of the real rectangular domain β, and the real rectangular domain α properly contains the real rectangular domain β when the real rectangular domain α and the real rectangular domain β are projected with respect to the Y-axis. In a second case, both the real rectangular domain α and the real rectangular domain β are cell domains, the real rectangular domain α is disposed above the real rectangular domain β, and the real rectangular domain α properly contains the real rectangular domain β when the real rectangular domain α and the real rectangular domain β are projected with respect to the X-axis. In a third case, the real rectangular domain α is disposed to the left of the real rectangular domain β, and the real rectangular domain α and the real rectangular domain β at least partially overlap each other when the real rectangular domain α and the real rectangular domain β are projected with respect to the Y-axis. In a fourth case, the real rectangular domain α is disposed above the real rectangular domain β, and the real rectangular domain α and the real rectangular domain β at least partially overlap each other when the real rectangular domain α and the real rectangular domain β are projected toward the X direction.

<Parallel Relationship (p)>

Figure 9:
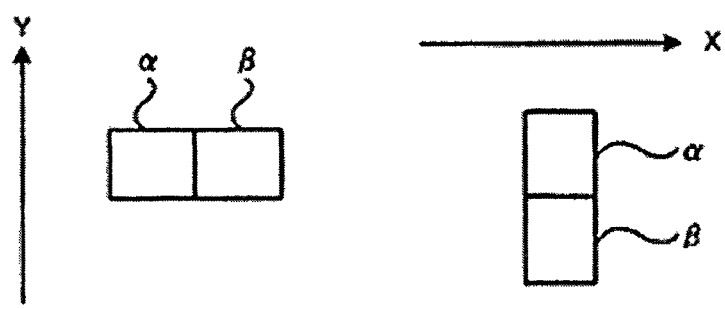
FIG. 9 shows a parallel relationship.

FIG. 9 shows a parallel relationship. In any of the cases described below, a parallel relationship (p) is satisfied between nodes a and b. The node a is a real rectangular domain α. The node b is a real rectangular domain β.

When both the real rectangular domain α and the real rectangular domain β are cell domains, the parallel relationship (p) is satisfied in any of the four cases described below. In a first case, the real rectangular domain α is disposed to the left of the real rectangular domain β, and the real rectangular domain α corresponds to the real rectangular domain β when the real rectangular domain α and the real rectangular domain β are projected with respect to the Y-axis. In a second case, the real rectangular domain α is disposed to the right of the real rectangular domain β, and the real rectangular domain α corresponds to the real rectangular domain β when the real rectangular domain α and the real rectangular domain β are projected with respect to the Y-axis. In a third case, the real rectangular domain α is disposed above the real rectangular domain β, and the real rectangular domain a corresponds to the real rectangular domain β when the real rectangular domain α and the real rectangular domain β are projected with respect to the X-axis. In a fourth case, the real rectangular domain α is disposed below the real rectangular domain β, and the real rectangular domain α corresponds to the real rectangular domain β when the real rectangular domain α and the real rectangular domain β are projected with respect to the X-axis.

In the other cases, the parallel relationship (p) is satisfied in the four cases described below. In a first case, the real rectangular domain α is disposed to the left of the real rectangular domain β, and the real rectangular domain α and the real rectangular domain β at least partially overlap each other when the real rectangular domain α and the real rectangular domain β are projected with respect to the Y-axis. In a second case, the real rectangular domain α is disposed to the right of the real rectangular domain β, and the real rectangular domain α and the real rectangular domain β at least partially overlap each other when the real rectangular domain α and the real rectangular domain β are projected with respect to the Y-axis. In a third case, the real rectangular domain α is disposed above the real rectangular domain β, and the real rectangular domain α and the real rectangular domain α at least partially overlap each other when the real rectangular domain α and the real rectangular domain β are projected with respect to the X-axis. In a fourth case, the real rectangular domain α is disposed below the real rectangular domain β, and the real rectangular domain α and the real rectangular domain β at least partially overlap each other when the real rectangular domain α and the real rectangular domain β are projected with respect to the X-axis.

<Word Relationship (w)>

Figure 10:
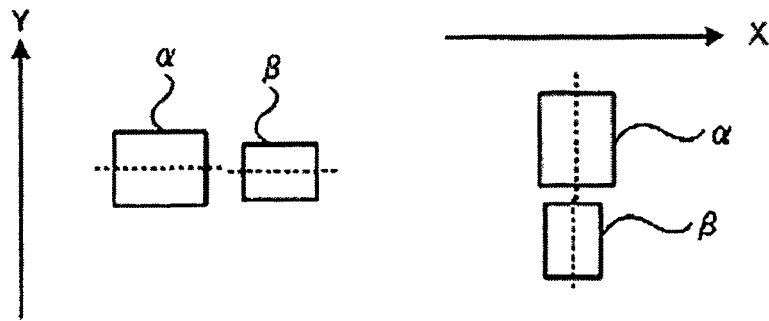
FIG. 10 shows a word relationship.

FIG. 10 shows a word relationship.

In any of the cases described below, a word relationship (w) is satisfied between nodes a and b. The node a is a real rectangular domain α. The node b is a real rectangular domain β. In a first case, the real rectangular domain α is disposed to the left of the real rectangular domain β, and the center line of the real rectangular domain a approximately corresponds to the center line of the real rectangular domain β. In a second case, the real rectangular domain α is disposed to the right of the real rectangular domain β, and the center line of the real rectangular domain a approximately corresponds to the center line of the real rectangular domain β. In a third case, the real rectangular domain α is disposed above the real rectangular domain β, and the center line of the real rectangular domain α approximately corresponds to the center line of the real rectangular domain β. In a fourth case, the real rectangular domain α is disposed below the real rectangular domain β, and the center line of the real rectangular domain α approximately corresponds to the center line of the real rectangular domain β.

<Independent Relationship (d)>

When the real rectangular domain α for the node a and the real rectangular domain β for the node b do not overlap each other, an independent relationship (d) is satisfied.

For example, the logical structure template Te1 of "whole" shown in FIG. 5A includes the "title" node nil, the "name" node n13, the "address" node n12, and the "questionnaire" node n14. The "title" node nil is associated with the "name" node n13 and the "address" node n12 on the basis of the hierarchical relationship (h).

The logical structure template Te2 of "topic" shown in FIG. 5B includes the "name" node n21, the "Roman character" node n22, the "signature" node n23, the "data#1" node n24, and the "data#2" node n25.

The "name" node n21 is associated with the "signature" node n23 and the "Roman character" node n22 on the basis of the hierarchical relationship (h). The "signature" node n23 is associated with the "data#1" node n24 on the basis of the hierarchical relationship (h). The "Roman character" node n22 is associated with the "data#2" node n25 on the basis of the hierarchical relationship (h).

The "signature" node n23 and the "Roman character" node n22 are associated with each other on the basis of the parallel relationship (p). The "data#1" node n24 and the "data#2" node n25 are associated with each other on the basis of the parallel relationship (p).

A further description will be provided referring back to FIG. 3.

The processor 120 searches for a point that satisfies the structure of a document layout input using a generated logical structure template. The processor 120 recognizes the entire logical structure by achieving matching of obtained search results. A form input will be described next as an example of a document layout.

Figure 11:
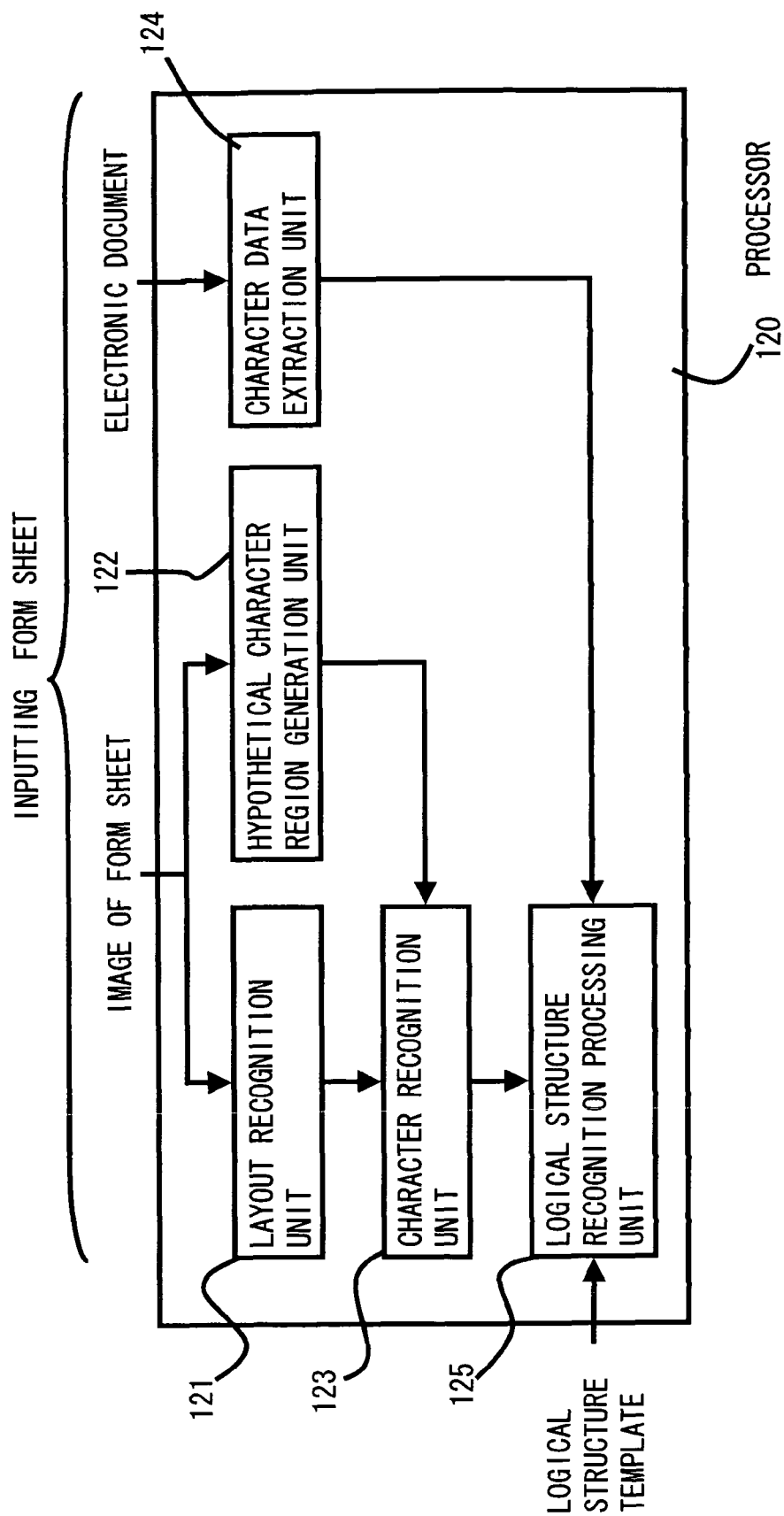
FIG. 11 is a block diagram showing functions of a processor.

FIG. 11 is a block diagram showing functions of the processor 120.

The processor 120 includes a layout recognition unit 121, a hypothetical character region generation unit 122, a character recognition unit 123, a character data extraction unit 124, and a logical structure recognition processing unit 125. The layout recognition unit 121 recognizes the layout of a form image obtained by scanning a form sheet with a scanner or the like and extracts a read region including a character image. The hypothetical character region generation unit 122 redundantly generates combinations of connection components that can form a character in a multiplexing manner.

Combinations are generated in a multiplexing manner in order to handle errors in layout recognition or character recognition.

Some kanji characters are formed by a plurality of components. Shapes of some components are the same as shapes of some characters. Thus, it is necessary to determine the range of a character region in character recognition processing.

Figure 12:
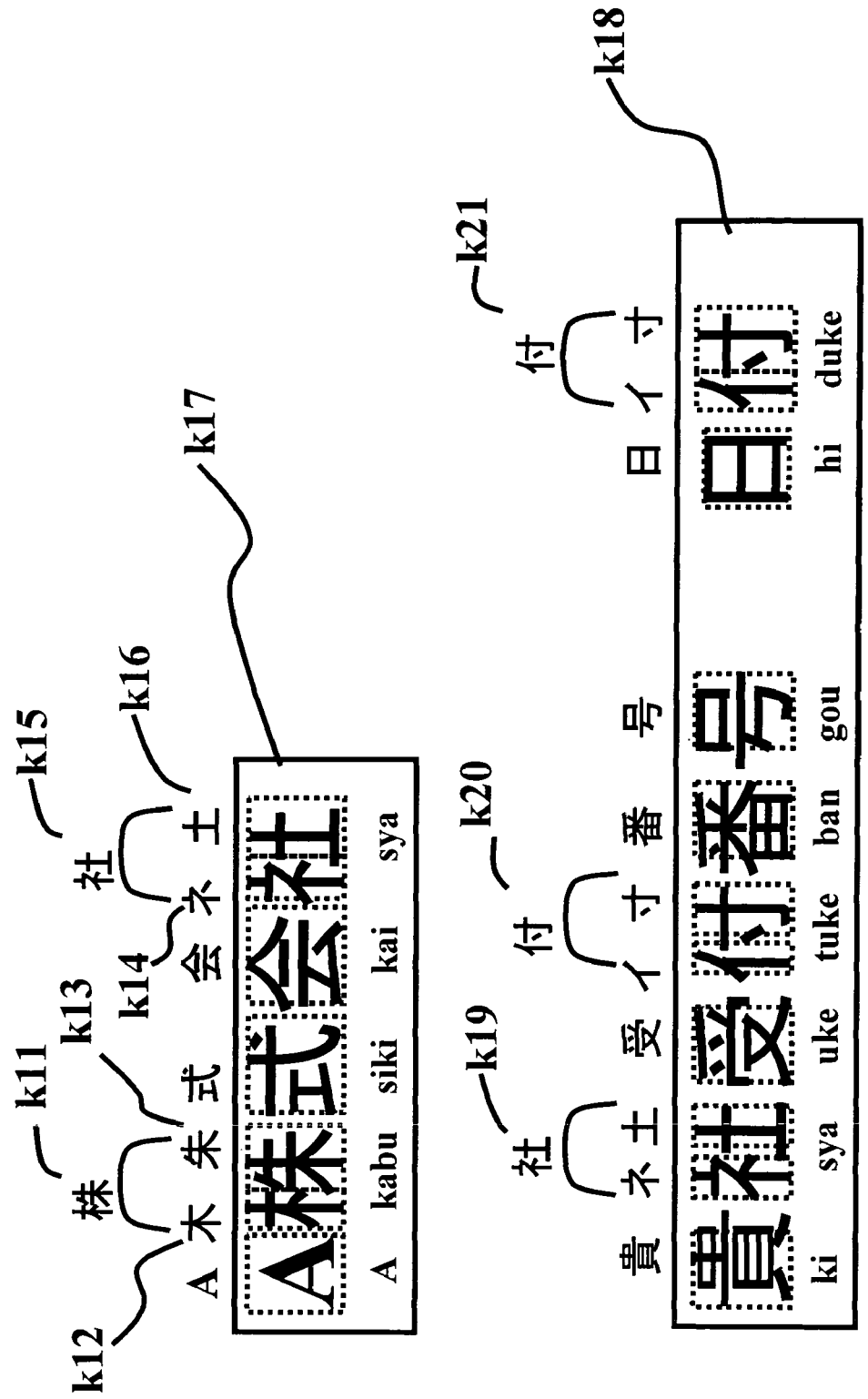
FIG. 12 illustrates functions of a hypothetical character region generation unit.

Functions of the hypothetical character region generation unit 122 will be described. FIG. 12 illustrates functions of the hypothetical character region generation unit 122. Reference mark k17 denotes a character string "A Company Limited 'A kabu siki kai sya'". Reference mark k18 denotes a character string "your receipt number date 'ki sya uke tuke ban gou hi duke'". Each of the character strings k17 and k18 includes a plurality of characters.

Reference mark k11 denotes a character. The character k11 includes components k12 and k13. Each of the components k12 and k13 may exist as an independent character. Reference numeral k14 denotes a character. The character k14 includes components k15 and k16. Each of the components k15 and k16 may exist as an independent character. The same applies to characters k19, k20, and k21 forming the character string k18.

The hypothetical character region generation unit 122 labels a binary image of a form image. For each connection component, the hypothetical character region generation unit 122 generates an integrated rectangle that is assumed as a character region including the connection component and an adjacent connection component. More specifically, the hypothetical character region generation unit 122 performs integration of a connection component and an adjacent connection component such that the size of the integrated components does not exceed a threshold size. For example, the hypothetical character region generation unit 122 performs integration in the vertical direction and then performs integration in the horizontal direction. A plurality of gradually increasing threshold sizes are prepared. The hypothetical character region generation unit 122 generates an integrated rectangle for each of the threshold sizes. The regions of integrated rectangles may overlap each other.

The processor 120 obtains an optimal character recognition result (character data) by selecting and using the function of the layout recognition unit 121 or the function of the hypothetical character region generation unit 122 depending on the situation.

The character recognition unit 123 outputs a character recognition result. For read regions extracted by the layout recognition unit 121, the character recognition unit 123 outputs character recognition results by performing character recognition using a recognition dictionary or the like. For integrated rectangles generated by the hypothetical character region generation unit 122, the character recognition unit 123 output character recognition results that overlap each other by recognizing an integrated rectangle as a character.

Figure 13:
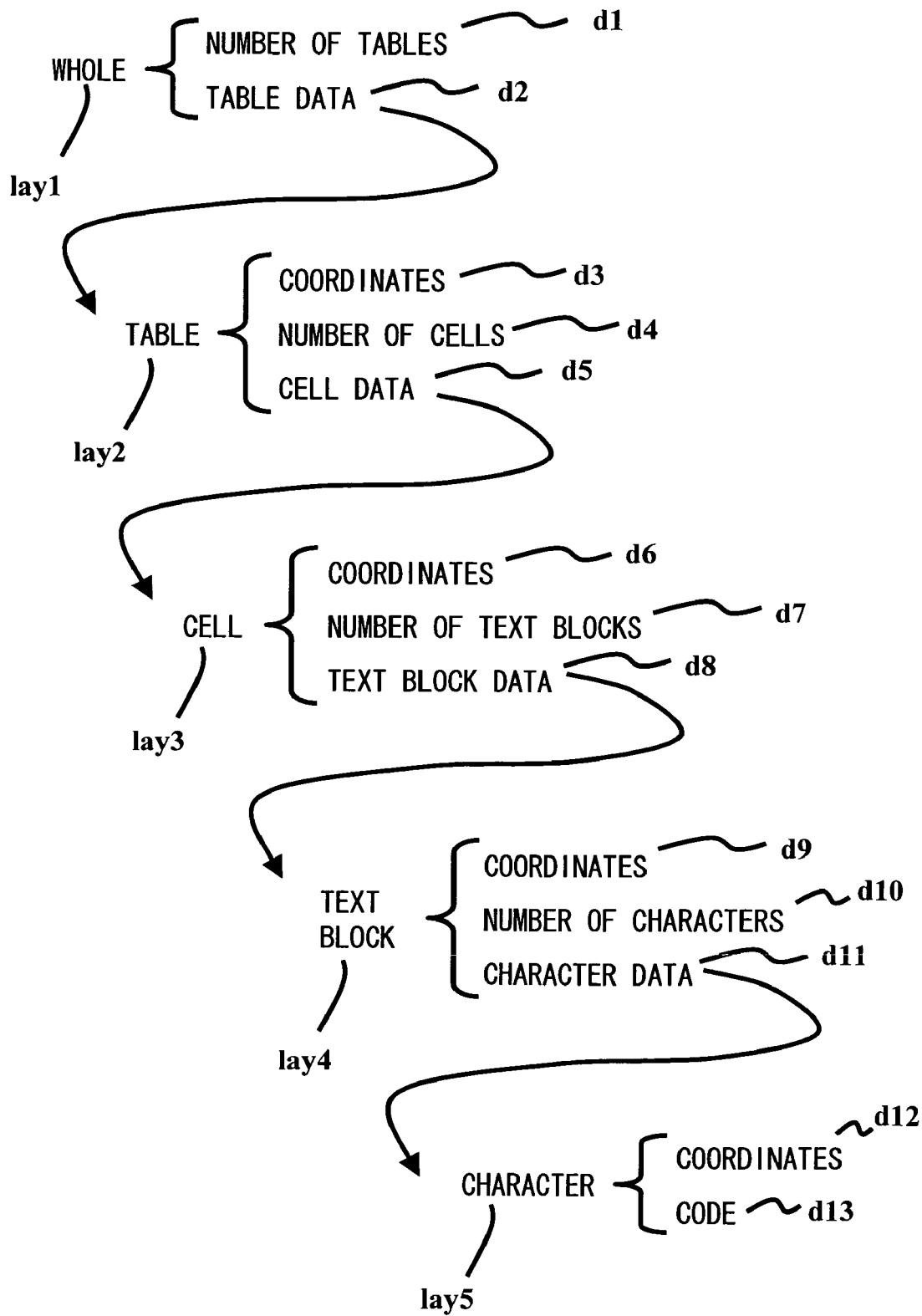
FIG. 13 schematically shows the data structure of a document layout hierarchy generated by a character recognition unit.

FIG. 13 schematically shows the data structure of a document layout hierarchy generated by the character recognition unit 123. A document layout has a hierarchical structure consisting of the following elements: "whole" lay1, "table" lay2, "cell" lay3, "text block" lay4, and "character" lay5.

The element "whole" lay1 includes data "number of tables" d1 and "table data" of a form. The data "table data" d2 is associated with the element "table" lay2. The data "table data" d2 includes data "coordinates" d3, "number of cells" d4, and "cell data" d5. The data "cell data" d5 is associated with the element "cell" lay3. The element "cell" lay3 includes data "coordinates" d6, "number of text blocks" d7, and "text block data" d8. The data "text block data" d8 is associated with the element "text block" lay4. The element "text block" lay4 includes data "coordinates" d9, "number of characters" d10, and "character data" d11. The data "character data" d11 is associated with the element "character" lay5. The element "character" lay5 includes data "coordinates" d12 and "code" d13.

A further description will be provided referring back to FIG. 11.

The character data extraction unit 124 extracts character data including code and coordinates from a received electronic document. An electronic document is generated, for example, by a document generation editor. The logical structure recognition processing unit 125 outputs a logical structure template. More specifically, the logical structure recognition processing unit 125 performs logical structure recognition processing on the basis of character data detected by the character recognition unit 123 or the character data extraction unit 124. The logical structure recognition processing unit 125 outputs, for example, a logical structure template that has the largest number of matching points.

<Logical Structure Recognition Processing>

Logical structure recognition processing is processing for sequentially performing matching between obtained character data and logical structure templates of "whole" and determining a result of matching with the logical structure template having the highest matching rate to be a logical structure recognition result. When matching between character data and a logical structure template is performed, a real domain for the logical structure template and a matching rate indicating the degree of matching are output.

Figure 14:
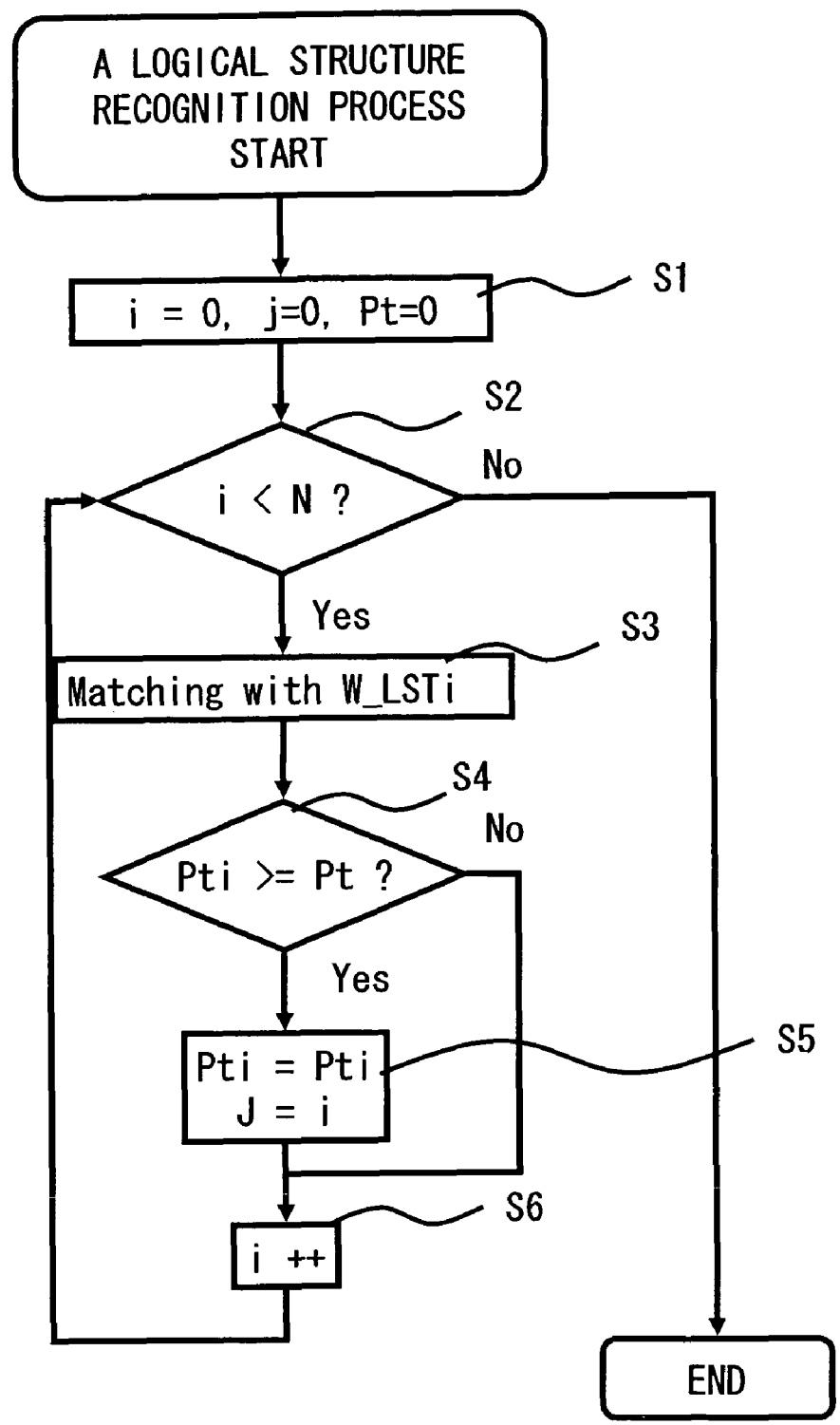
FIG. 14 is a flowchart of a logical structure recognition process.

FIG. 14 is a flowchart of a logical structure recognition process. In the flowchart shown in FIG. 14, "N" represents the number of logical templates of "whole", "W_LSTi (i=0, ..., N−1)" represents a logical template of "whole", "Pti ($0 \leq Pti \leq 1$)" represents the matching rate of a character string of the ith item, and "Pt" represents the highest matching rate.

The logical structure recognition processing unit 125 initializes parameters i, j, and Pt (i=0, j=−1, Pt=0) (step S1). The logical structure recognition processing unit 125 determines whether the parameter i is smaller than the number N (step S2). If it is determined in step S2 that the parameter i is equal to or larger than the number N (if the determination in step S2 is No), the logical structure recognition processing unit 125 terminates the logical structure recognition process. If it is determined in step S2 that the parameter i is smaller than the number N (if the determination in step S2 is Yes), the logical structure recognition processing unit 125 performs matching with respect to a logical template "W_LSTi" and obtains the matching rate Pti (matching processing) (step S3). The matching processing will be described later.

The logical structure recognition processing unit 125 determines whether the matching rate Pti obtained by the matching processing is equal to or higher than the highest matching rate Pt (step S4). If it is determined in step S4 that the matching rate Pti is lower than the highest matching rate Pt (if the determination in step S4 is No), the logical structure recognition processing unit 125 proceeds to step S6. If it is determined in step S4 that the matching rate Pti is equal to or higher than the highest matching rate Pt (if the determination in step S4 is Yes), the logical structure recognition processing unit 125 sets the matching rate Pti to be equal to the highest matching rate Pt and sets the parameter j to i (step S5). Then, the logical structure recognition processing unit 125 increments the parameter i (step S6), and the process returns to step S2.

Accordingly, the logical structure recognition processing unit 125 terminates the logical structure recognition process.

The logical structure recognition processing unit 125 is capable of obtaining a matching result by extracting the matching rate Pt and the logical template W_LSTi at the termination of the logical structure recognition process.

Figure 15:
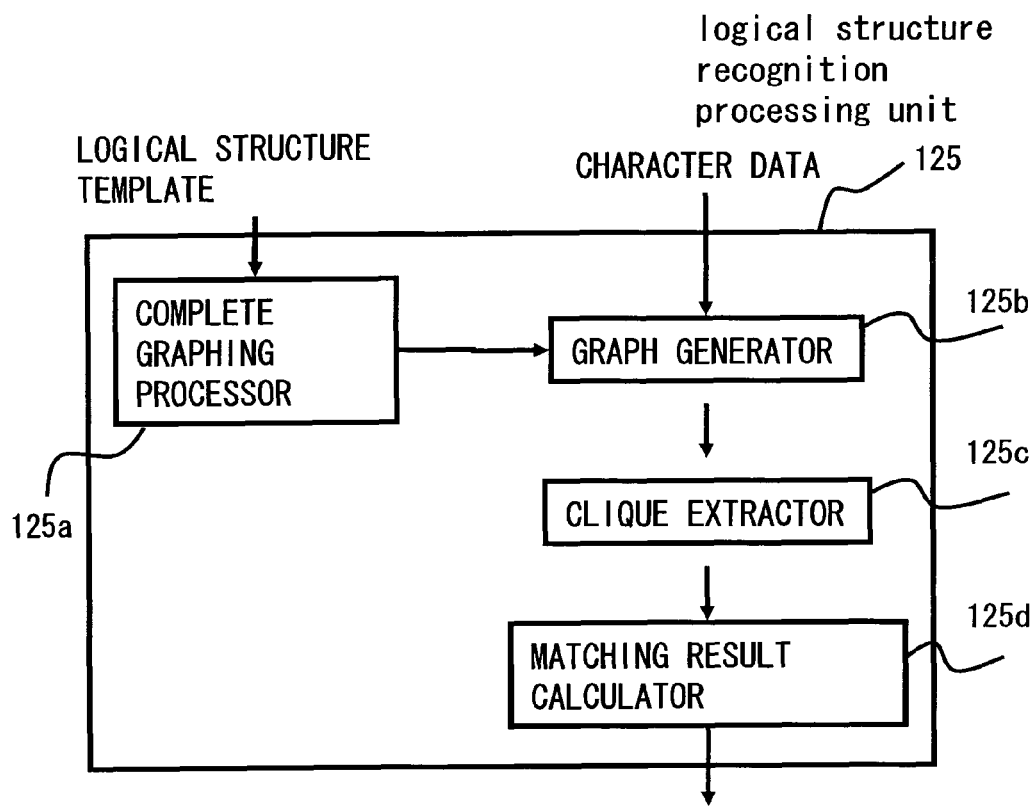
FIG. 15 is a block diagram showing functions of the logical structure recognition processing unit.

Matching processing will be described next. FIG. 15 is a block diagram showing functions of the logical structure recognition processing unit 125. The logical structure recognition processing unit 125 includes a complete graphing processor 125a, a graph generator 125b, a clique extractor 125c, and a matching result calculator 125d.

<Complete Graphing Processor>

Complete graphing means defining a logical structure template. For elements of a logical structure template whose relationship is not clearly defined, the complete graphing processor 125a defines the logical structure template using a clearly defined relationship between an element and each of the other elements.

Figure 16A:
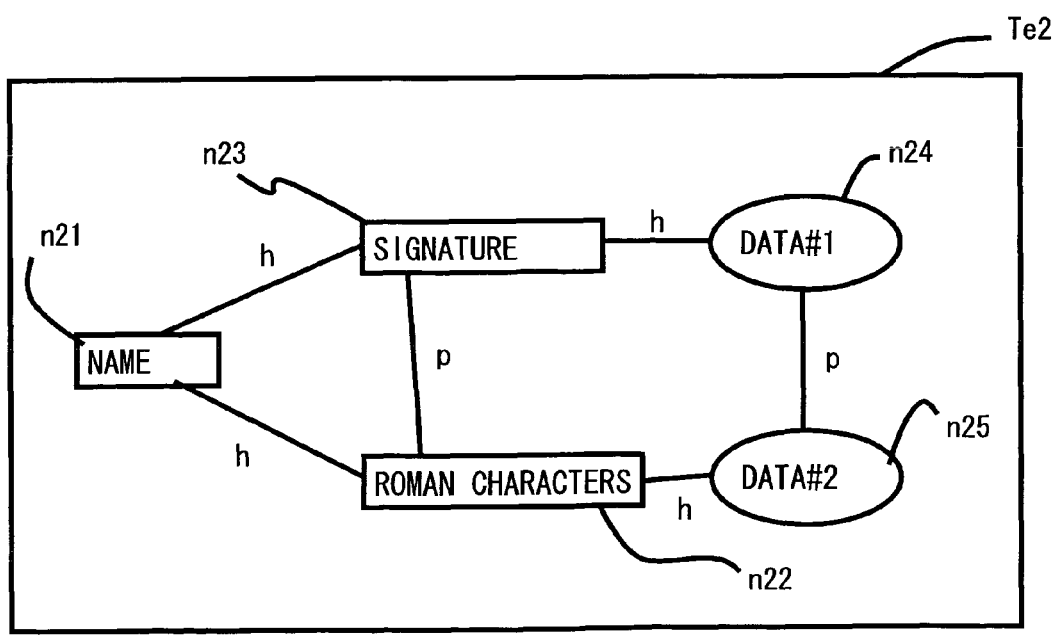
FIGS. 16A and 16B are illustrations for explaining complete graphing processing.

FIG. 16A is an illustration for explaining complete graphing processing. The logical structure template Te2 includes a plurality of nodes. The relationship between the "name" node n21 and each of the "data#1" node n24 and the "data#2" node n25 is unclear. In addition, the relationship between the "signature" node n23 and the "data#2" node n25 is unclear. In addition, the relationship between the "Roman character" node n22 and the "data#1" node n24 is unclear. In complete graphing processing, the above-mentioned unclear relationships are defined.

For example, in a case where real domains P, Q, and R exist, when the real domains P and Q have a hierarchical relationship and the real domains Q and R have a hierarchical relationship (each of the relationships between real domains that are indirectly connected to each other is a hierarchical relationship), the real domains P and R have a hierarchical relationship.

Referring to FIG. 16A, the "name" node n21 and the "signature" node n23 have a hierarchical relationship (h), and the "signature" node n23 and the "data#1" node n24 have a hierarchical relationship (h). Thus, the "name" node n21 and the "data#1" node n24 have a hierarchical relationship (h), and the "name" node n21 and the "data#2" node n25 have a hierarchical relationship (h).

In contrast, when at least one of the relationships between indirectly connected real rectangular domains is a relationship other than the hierarchical relationship, this relationship is represented as an independent relationship (d). In the logical structure template Te2, a "signature" node n23 and a "data#1" node n24 have a hierarchical relationship (h). However, the "data#1" node n24 and a "data#2" node n25 have a parallel relationship (p). Thus, the "signature" node n23 and the "data#2" node n25 have an independent relationship (d).

In a case where real domains are indirectly connected to each other with a plurality of real rectangular domains therebetween, when paths having a relationship other than the hierarchical relationship exists, this relationship is represented as an independent relationship (d). Referring to FIG. 16A, a "Roman character" node n22 and the "data#1" node n24 have an independent relationship (d).

Figure 16B:
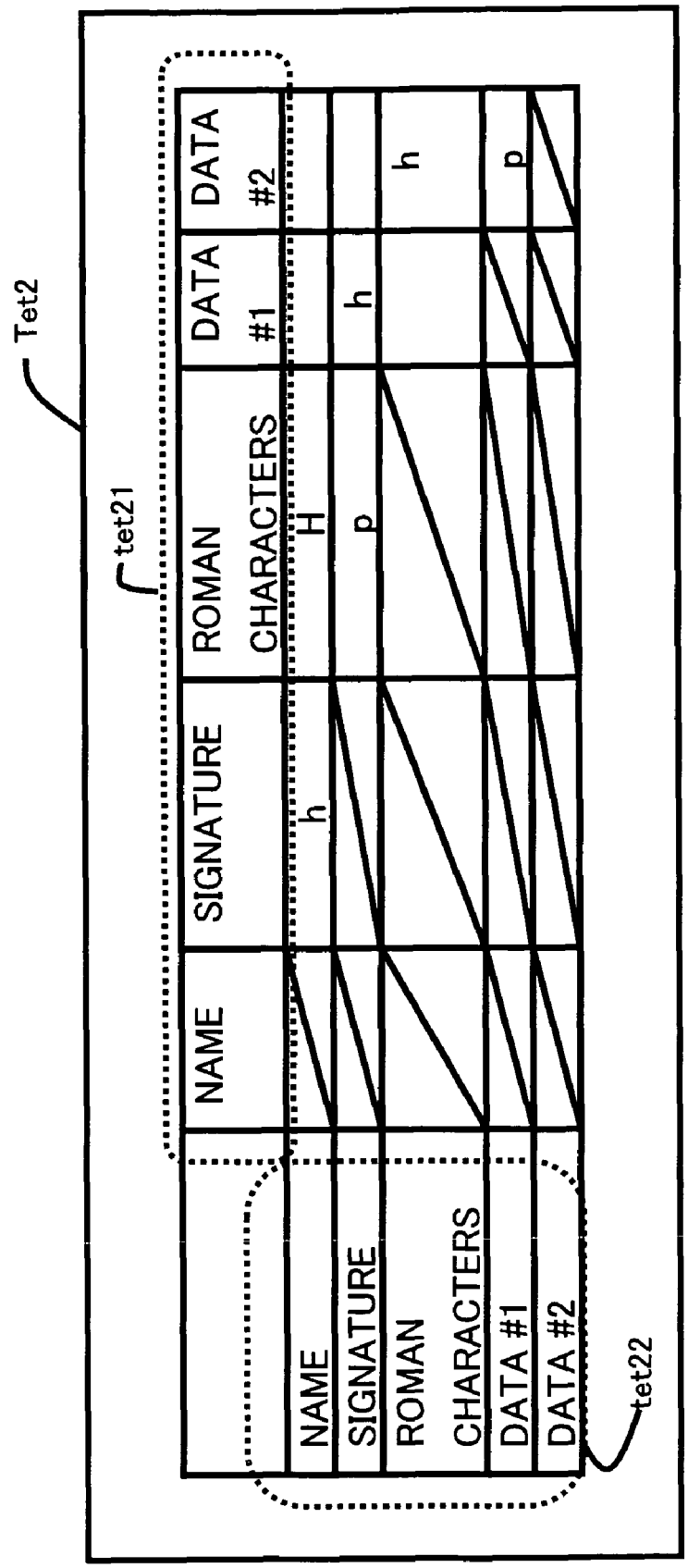

FIG. 16B shows the structure of a template table Tet2 that expresses the logical structure template Te2 in a tabular format. The complete graphing processor 125a performs complete graphing processing on the logical structure template Te2 using the template table Tet2 or the like. In the template table Tet2, nodes are disposed in column items tet21 of the table and in row items tet22 of the table. In fields corresponding to intersection points of the column items tet21 and the row items tet22, hierarchical relationships of paths are set. Complete graphing is achieved by filling all the blank fields of the template table Tet2 with relationships.

Figures 17A, 17B:
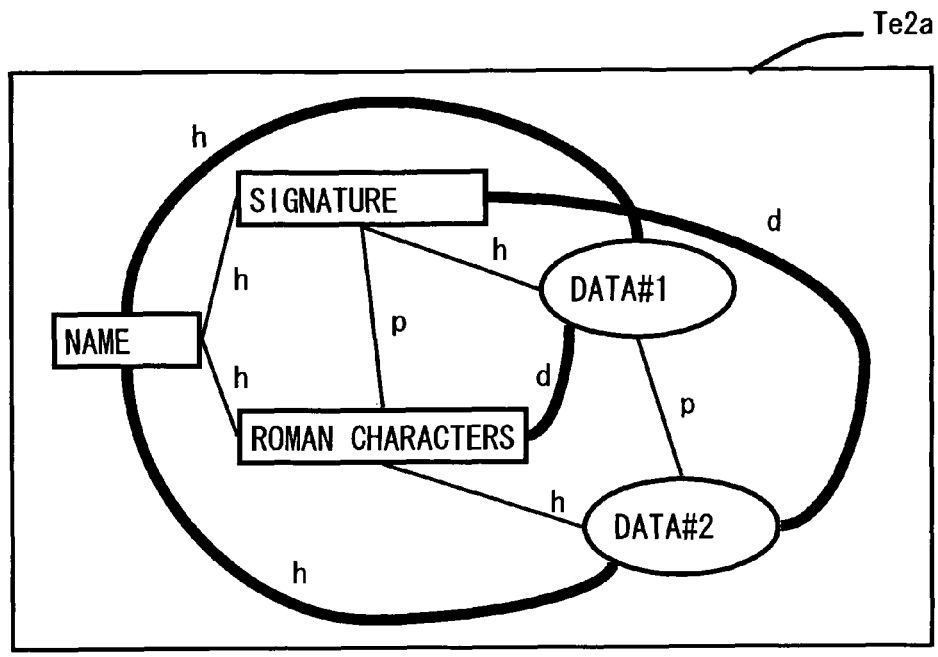
FIGS. 17A and 17B are illustrations of logical structure templates that have been subjected to complete graphing processing.

FIG. 17A shows a logical structure template that has been subjected to complete graphing processing. As shown in FIG. 17A, a logical structure template Te2a in which paths are connected is acquired. FIG. 17B shows a template table Tet2 that has been subjected to complete graphing processing. Due to the execution of complete graphing processing, all the blank fields of the template table Tet2 are filled with relationships.

<Graph Generator>

With respect to each node forming a logical structure template that has been subjected to complete graphing processing, the graph generator 125b searches for a real domain of received character data. The graph generator 125b makes a list of found real domains (listing processing). The graph generator 125b determines whether listed real domains satisfy a relationship defined in the logical structure template. The graph generator 125b generates a graph representing matching between real domains.

<Listing Processing>

Listing processing will be described next. In the listing processing, with respect to each node, matching between a logical structure template and a lower-level logical structure template belonging to a possible template list is recursively performed. Then, a plurality of real domains are extracted as candidates.

Figure 18:
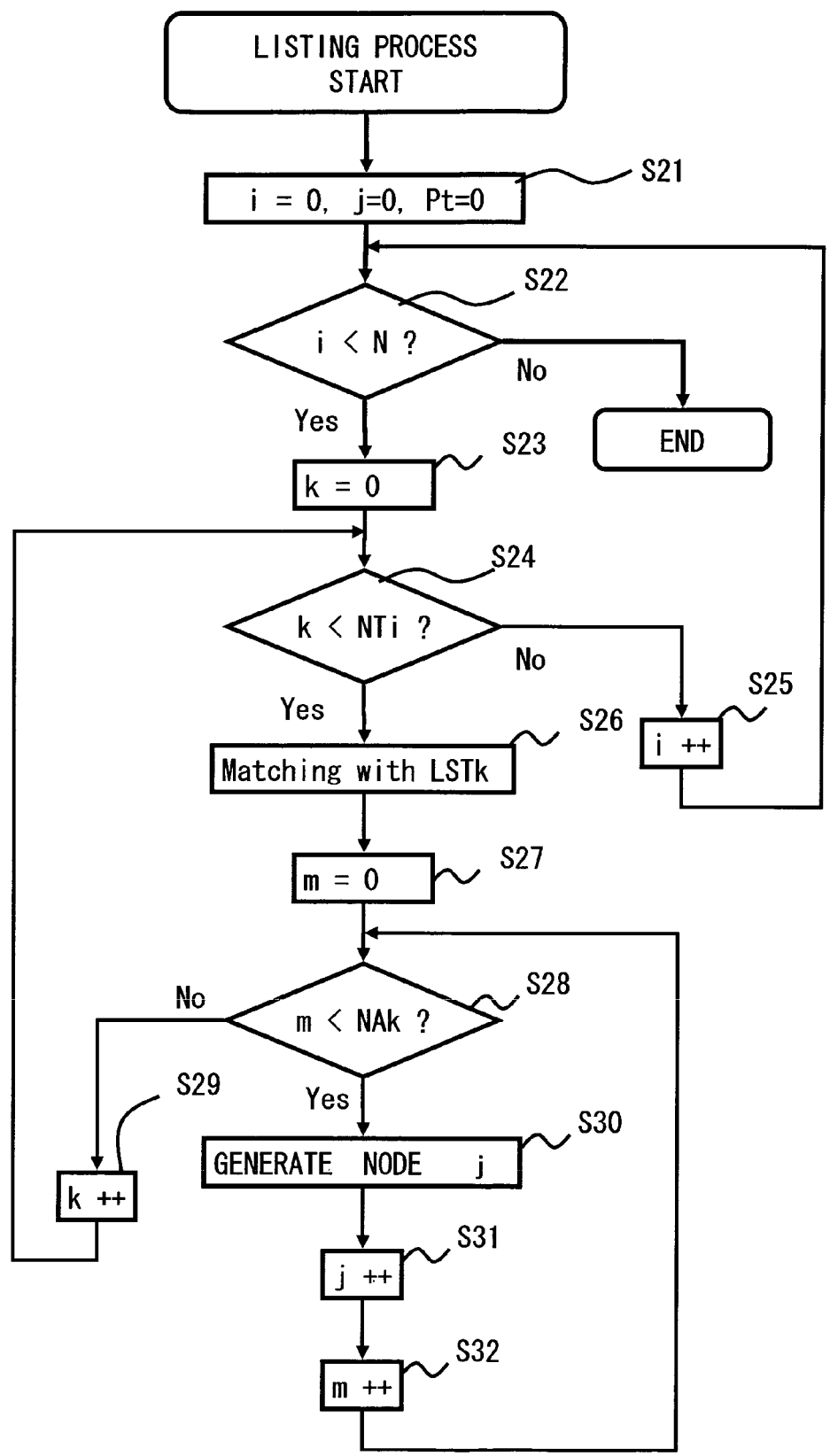
FIG. 18 is a flowchart of a listing process.

FIG. 18 is a flowchart of a listing process. In the flowchart of FIG. 18, "N" represents the number of nodes in a logical structure template that is to be subjected to matching, "NTi" represents the number of possible templates stored in a possible template list added to a node, "LSTk" represents a kth possible template, and "NAk" represents the number of templates detected by matching.

The graph generator 125b initializes i and j, which are to be used as parameters, (i=0, j=0) (step S21). The graph generator 125b determines whether the parameter i is smaller than the number N (step S22). If it is determined in step S22 that the parameter i is equal to or larger than the number N (if the determination in step S22 is No), the graph generator 125b terminates the listing process. If it is determined in step S22 that the parameter i is smaller than the number N (if the determination in step S22 is Yes), the graph generator 125b initializes k, which is to be used as a parameter relating to the number of possible templates (step S23).

Then, the graph generator 125b determines whether the parameter k is smaller than the number NTi (step S24). If it is determined in step S24 that the parameter k is equal to or larger than the number NTi (if the determination in step S24 is No), the graph generator 125b increments the parameter i (step S25). Then, the process returns to step S22, and the graph generator 125b repeats the subsequent processing. If it is determined in step S24 that the parameter k is smaller than the number NTi (if the determination in step S24 is Yes), the graph generator 125b performs matching with respect to a possible template LSTk (step S26).

Then, the graph generator 125b initializes m, which is to be used as a parameter, (m=0) (step S27). The graph generator 125b determines whether the parameter m is smaller than the number NAk (step S28). Since the parameter m is initialized in step S27, if the number NAk is not 0 (that is, if the number of matching templates is one or more), the parameter m is smaller than the number NAk. If it is determined in step S28 that the parameter m is equal to or larger than the number NAk (if the determination in step S28 is No), the graph generator 125b increments the parameter k (step S29). Then, the process returns to step S24, and the graph generator 125b repeats the subsequent processing. If it is determined in step S28 that the parameter m is smaller than the number NAk (if the determination in step S28 is Yes), the graph generator 125*b* generates a node j (step S30).

Then, the graph generator 125*b* increments the parameter j (step S31). The graph generator 125*b* increments the parameter m (step S32). Then, the process returns to step S28, and the graph generator 125*b* repeats the subsequent processing.

Figures 19A, 19B:
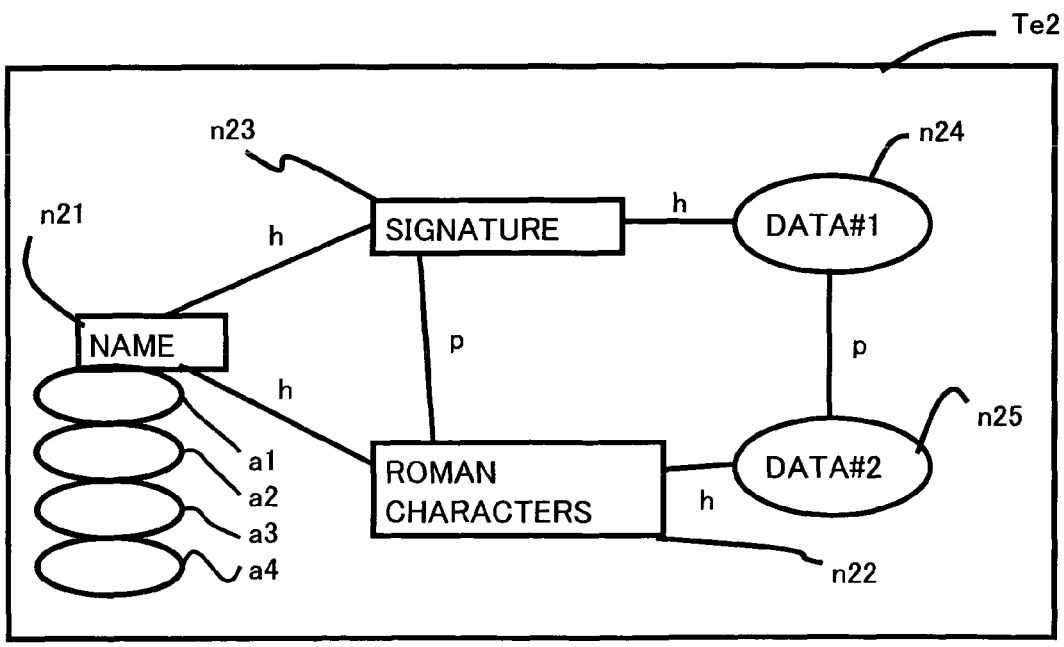
FIGS. 19A and 19B are illustrations for explaining a specific example of listing processing.
Figure 20A:
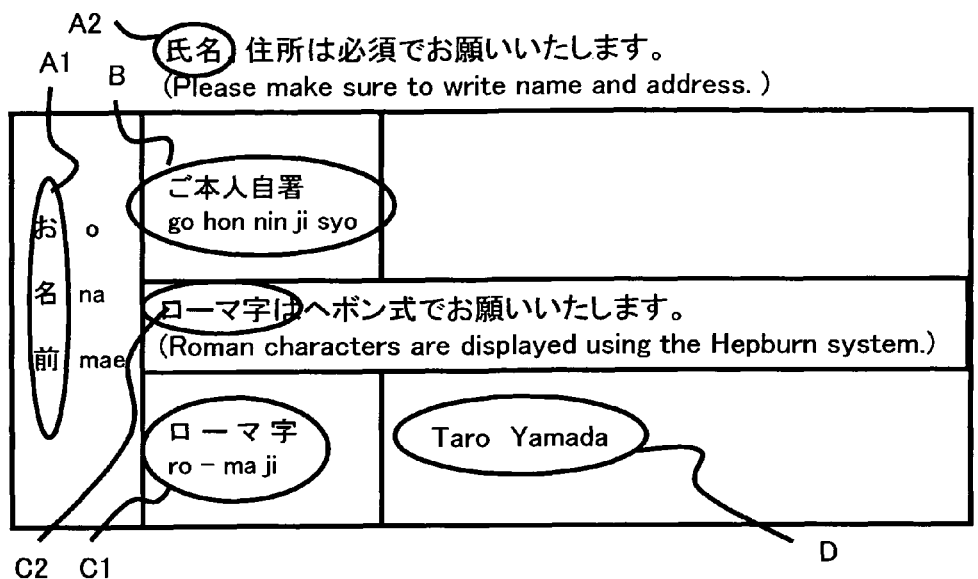
FIGS. 20A and 20B are illustrations for explaining a specific example of listing processing.
Figure 20B:
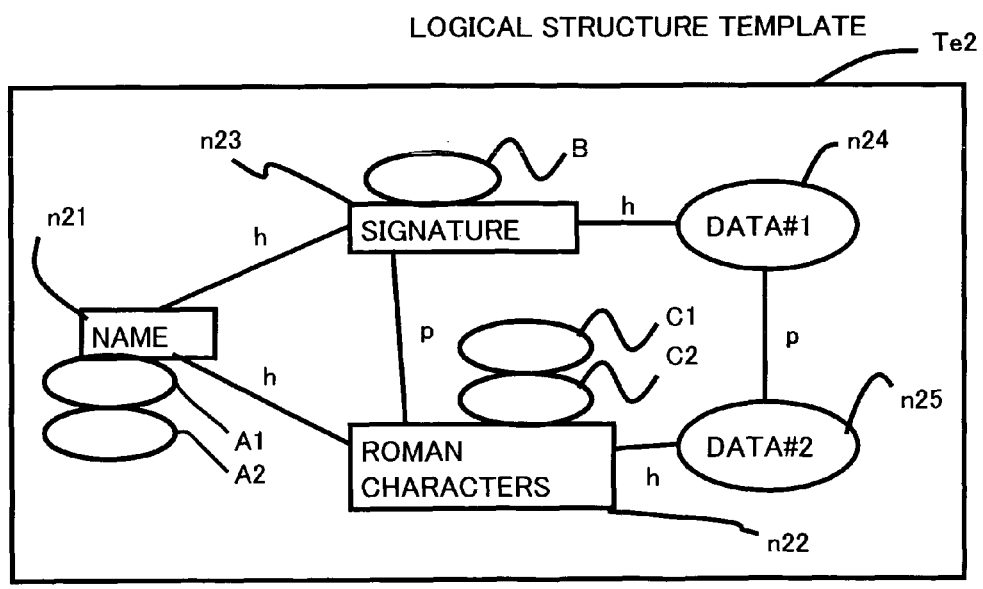

A specific example of listing processing will be described. FIGS. 19A, 19B, 20A, and 20B are illustrations for explaining specific examples of the listing processing. FIGS. 19A and 20A show document layouts. FIGS. 19B and 20B illustrate processes for performing listing processing for a logical structure template.

As shown in FIG. 19B, the logical structure template Te2 includes five nodes. Thus, the number N is "5". Listing processing is sequentially performed for the five nodes. In this example, a case where listing processing is performed for the "name" node n21 will be explained. The "name" node n21 is identified with one of possible templates stored in a possible template list of the "name" node n21 (a possible template list located at the hierarchical level below "topic"). As described above, the possible template list of the "name" node n21 includes the "name 'na mae'" node n211, the "name 'o na mae'" node n212, the "name 'si mei'" node n213, and the "name 'go si mei'" node n214. Thus, the number NTi is "4".

The graph generator 125*b* recursively performs matching with respect to the four nodes (the lower-level logical structure templates). In the case of the "name 'o na mae'" node n212, one corresponding domain exists for the logical structure template of "name 'o na mae'" (NAk=1). In accordance with the number of domains, the graph generator 125*b* generates a real domain a1 as a candidate. The graph generator 125*b* also generates a real domain a2 for the "name 'na mae'". The graph generator 125*b* generates a real domain a3 for the "name 'si mei'". The graph generator 125*b* generates a real domain a4, which is the same as the real domain a3, for the "name 'go si mei'".

The real domain a2 is contained in the real domain a1. Thus, the graph generator 125*b* deletes the real domain a2. Although the real domain a4 is the same as the real domain a3, the matching rate of the real domain a3 is 1 and the matching rate of the real domain a4 is 0.67. Thus, the graph generator 125*b* deletes the real domain a4. Then, as shown in FIG. 20B, the graph generator 125*b* describes the real domain a1 as a real domain A1, and describes the real domain a3 as a real domain A2. Accordingly, the graph generator 125*b* generates a graph.

Figure 21:
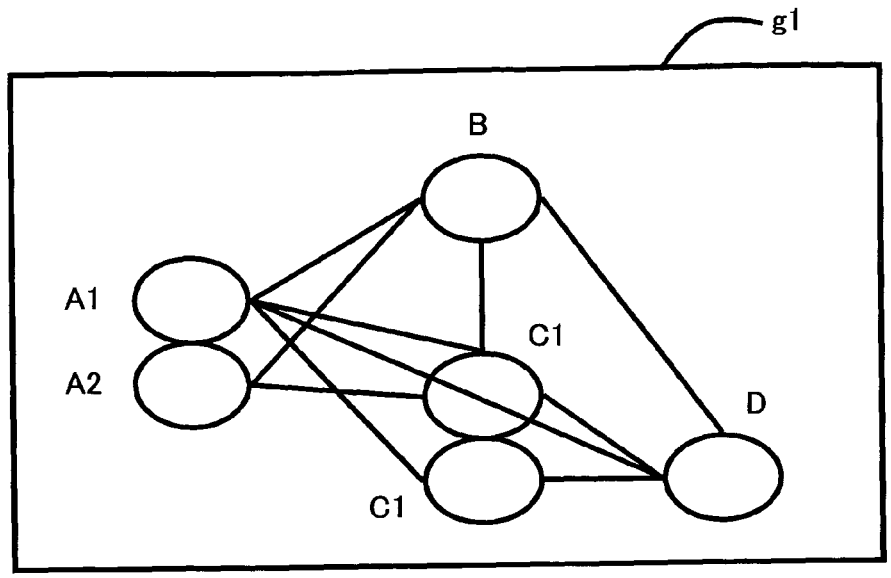
FIG. 21 shows a generated graph.

FIG. 21 shows a generated graph.

The graph generator 125*b* determines whether listed real domains satisfy a relationship defined in a logical structure template. This determination is performed by comparing the relationship between coordinates included in character data in the real domains and the relationship between nodes of the logical structure template. If the graph generator 125*b* determines that the real domains satisfy the relationship, nodes corresponding to the real domains are connected through a path. If the graph generator 125*b* determines that the real domains do not satisfy the relationship, no processing is performed. As described above, the graph generator 125*b* generates a graph g1 representing the matching between real domains.

<Clique Extractor>

The clique extractor 125*c* extracts a clique from the generated graph g1. A clique is a maximum set of vertices where edges exist between two vertices. The clique extractor 125*c* extracts a set of real domains satisfying the logical structure template in accordance with the extracted clique.

Figure 22:
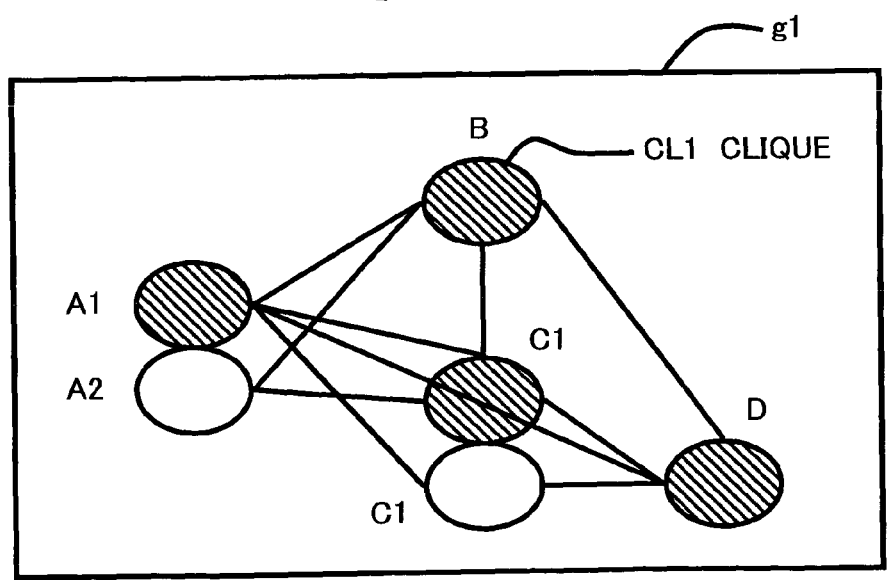
FIG. 22 shows an extracted clique.

FIG. 22 shows an extracted clique. The clique extractor 125*c* extracts a clique CL1, which forms a maximum complete subgraph, represented by oblique lines. A maximum complete subgraph is formed such that each real domain is connected to each of the other real domains. That is, all the real domains forming a clique are each connected to each of the other real domains through a path.

Referring to FIG. 21, the real domain A1 is connected to each of the other real domains B, C1, C2, and D through a path. Thus, the clique extractor 125*c* selects the real domain A1 as a real domain forming a clique. A set of real domains corresponding to a clique partially (or completely) satisfies a logical structure template.

<Matching Result Calculator>

The matching result calculator 125*d* selects a clique from among extracted cliques (normally, a plurality of cliques are extracted). The number of nodes of the selected clique is larger than a predetermined proportion of the number of nodes forming a logical structure template. The matching result calculator 125*d* calculates, as matching results, the selected clique and the matching rate (the number of nodes of the clique/the number of nodes forming the logical structure template). In the case of the clique CL1 shown in FIG. 22, correspondence of four nodes other than "signature" node among the original five nodes is achieved. The matching result calculator 125*d* calculates the matching rate of matching with respect to the corresponding nodes in a lower character hierarchical level. For example, character data of a form image is A1 "o na mae", B "go ki nin ji syo", C1 "ro-ma ji", and D "Taro Yamada". When the clique CL1 is compared with data of the logical structure template Te2, one character in character data B is different (hon→ki). Thus, the matching rate of each of the character data A, C1, and D is 100%, whereas the matching rate of the character data B is 80% (four words/five words). As a result, the matching rate of the clique CL1 to the data of the logical structure template Te2 is $(1+0.8+1+0+1)/5=0.76$.

As described above, the logical structure recognition apparatus 100 according to this embodiment stores in advance in the logical-structure-template storage unit 112 a plurality of qualitative layout structures relating to headers and data as logical structure templates. The processor 120 of the logical structure recognition apparatus 100 predicts processing results by performing logical structure recognition processing for a received form layout. For example, extracting a template in which a header is disposed in a totally different position or associating data disposed in a totally different position with a header is not performed.

In addition, since the logical structure recognition apparatus 100 additionally registers a logical structure template, the logical structure recognition apparatus 100 easily obtains outside information. Thus, the logical structure recognition apparatus 100 achieves highly flexible logical structure recognition processing for various forms, such as estimate sheets, statements of delivery, and the like. The logical structure recognition apparatus 100 achieves high-accuracy logical structure recognition processing in accordance with a common method without the necessity of parameter tuning or the like.

In addition, since the processor 120 of the logical structure recognition apparatus 100 performs logical structure recognition processing, there is no need to prepare high-accuracy and complicated models for forms having various layouts.

In addition, the complete graphing processor 125*a* of the logical structure recognition apparatus 100 performs complete graphing processing for a logical structure template. Thus, an issue relating to execution of matching can be converted into an issue relating to extraction of a clique from a graph. In addition, the graph generator 125*b* generates a graph. The clique extractor 125*c* extracts a clique from the generated graph. The matching result calculator 125*d* calculates a matching result in accordance with the extracted clique. With the above-mentioned processing, the logical structure recognition apparatus 100 is capable of recognizing the logical structure of a form document without being affected by an error in layout recognition or character recognition.

In this embodiment, the logical structure recognition apparatus 100 generates a template. However, a template is not necessarily generated by the logical structure recognition apparatus 100. For example, a logical structure template prepared in advance by an external apparatus may be read into the logical structure recognition apparatus 100.

A logical structure recognition program, a logical structure recognition method, and a logical structure recognition apparatus according to an embodiment of the present invention have been described with reference to the drawings. However, the present invention is not limited to the above-described embodiment. The configuration of each unit may be replaced with a desired configuration having a similar function. In addition, other desired components or processes may be added to the present invention. In addition, desired two or more configurations (features) of the above-described embodiments can be combined together.

The above-described processing functions can be implemented by a computer. In this case, a program in which the contents of processing of functions to be executed by the logical structure recognition apparatus 100 are described is provided. The above-described processing functions can be achieved by the computer when the computer executes the program. The program in which the processing contents are described may be recorded in a computer-readable recording medium. The computer-readable recording medium may be, for example, a magnetic recording device, an optical disk, a magneto-optical recording medium, a semiconductor memory, or the like. The magnetic recording device may be, for example, a hard disk drive (HDD), a flexible disk (FD), a magnetic tape, or the like. The optical disk may be, for example, a digital versatile disc (DVD), a digital versatile disc random-access memory (DVD-RAM), a compact disc read-only memory (CD-ROM), a compact disc recordable (CD-R)/compact disc rewritable (CD-RW), or the like. The magneto-optical recording medium may be, for example, a magneto-optical disk (MO) or the like.

In order to distribute a program, for example, a portable recording medium, such as a DVD, a CD-ROM, or the like, in which the program is recorded is sold. Alternatively, the program may be stored in a storage device of a server computer so that the server computer can transfer the program to another computer via a network.

For example, a computer that performs a logical structure recognition program stores a program recorded in a portable recording medium or a program transferred from a server computer into a storage device of the computer. The computer reads the program from the storage device of the computer and executes processing in accordance with the program. Alternatively, the computer may directly read the program from the portable recording medium and execute processing in accordance with the program. Alternatively, every time receiving a program from the server computer, the computer may perform processing in accordance with the received program.

What is claimed is:

1. An apparatus for analyzing of a given form, comprising:
   a memory for storing a plurality of templates having a plurality of nodes, each of the plurality of templates being related with each other by a hierarchical structure, each of the plurality of nodes included in one of the plurality of higher templates of the hierarchical structure being associated to one of the plurality of lower templates of the hierarchical structure, each of the plurality of nodes included in one of the plurality of the higher templates being associated to one of a header part and a data part included in the given form, each of the plurality of nodes included in one of the plurality of the lower templates being associated to characteristic information, and each of the plurality of templates including positional relationship information indicating position of the each of the plurality of nodes included in the each of the plurality of templates; and
   a processor for
   obtaining characteristic information including in a plurality of blocks included in a form and position relationship of each of the plurality of blocks,
   detecting lower templates corresponding to the obtained characteristic information by calculating matching between the characteristic information included in a plurality of blocks and the characteristic information associated to the each of the plurality of nodes,
   determining higher templates including nodes corresponding to the detected lower templates,
   detecting a higher template corresponding to the form by comparing position relationship of each of the plurality of blocks and each of positional relationship information included in the determined higher templates, and
   outputting the characteristic information associated to the header part and the data part of the plurality of nodes included in the detected higher template.

2. A method of analyzing of a form, comprising:
   obtaining characteristic information included in a plurality of blocks included in a form and a position relationship of each of the plurality of blocks;
   reading out storing a plurality of templates having a plurality of nodes, each of the plurality of templates being related with each other by a hierarchical structure, each of the plurality of nodes included in one of the plurality of higher templates of the hierarchical structure being associated to one of the plurality of lower templates of the hierarchical structure, each of the plurality of nodes included in one of the plurality of the higher templates being associated to one of a header part and a data part included in the given form, each of the plurality of nodes included in one of the plurality of the lower templates being associated to characteristic information, each of the plurality of templates including a positional relationship information indicating position of the each of the plurality of nodes included in the each of the plurality of templates;
   detecting lower templates corresponding to the obtained characteristic information by calculating matching between the characteristic information included in a plurality of blocks and the characteristic information associated to the each of the plurality of nodes;
   determining higher templates including nodes corresponding to the detected lower templates;
   detecting a higher template corresponding to the form by comparing position relationship of each of the plurality of blocks and each of positional relationship information included in the determined higher; and
   outputting the characteristic information associated to the header part and the data part of the plurality of nodes included in the detected higher template.

* * * * *